（12）United States Patent
Granados et al.

(10) Patent No.: US 9,275,445 B2
(45) Date of Patent: Mar. 1, 2016

(54) HIGH DYNAMIC RANGE AND TONE MAPPING IMAGING TECHNIQUES

(71) Applicant: DISNEY ENTERPRISES, INC., Burbank, CA (US)

(72) Inventors: Miguel Granados, Saarbruecken (DE); Jose Rafael Tena, Pittsburgh, PA (US); Tunc Ozan Aydin, Zurich (CH); Jean Francois Lalonde, Quebec City (CA); Christian Theobalt, Saarbruecken (DE); Iain Matthews, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 14/469,191

(22) Filed: Aug. 26, 2014

(65) Prior Publication Data
US 2015/0078661 A1   Mar. 19, 2015

Related U.S. Application Data

(60) Provisional application No. 61/869,875, filed on Aug. 26, 2013.

(51) Int. Cl.
*G06K 9/00* (2006.01)
*G06T 5/00* (2006.01)
*G06T 5/50* (2006.01)

(52) U.S. Cl.
CPC .............. *G06T 5/009* (2013.01); *G06T 5/003* (2013.01); *G06T 5/50* (2013.01); *G06T 2207/10024* (2013.01); *G06T 2207/20208* (2013.01); *G06T 2207/20216* (2013.01); *G06T 2207/20221* (2013.01)

(58) Field of Classification Search
USPC .......................... 382/162, 167, 163, 168, 274; 348/222.1, 208.14, 223.1, 228.1, 348/231.3, 241, 220.1
See application file for complete search history.

(56) References Cited

U.S. PATENT DOCUMENTS

| 7,023,580 | B2 | 4/2006 | Zhang et al. |
| 7,433,514 | B2 | 10/2008 | Sloan |
| 8,184,919 | B2 | 5/2012 | Ward |
| 8,314,847 | B2 | 11/2012 | Brunner et al. |
| 8,358,351 | B2 | 1/2013 | Brunner et al. |
| 8,363,131 | B2 | 1/2013 | Lin |
| 8,391,598 | B2 | 3/2013 | Lin |
| 8,570,396 | B2 | 10/2013 | Rapaport |

(Continued)

FOREIGN PATENT DOCUMENTS

| WO | 2014009844 A1 | 1/2014 |
| WO | 2014025588 A1 | 2/2014 |
| WO | 2014041355 A1 | 3/2014 |

*Primary Examiner* — Anh Do
(74) *Attorney, Agent, or Firm* — Robert G. Crouch; Marsh Fischmann & Breyfogle LLP

(57) ABSTRACT

Algorithms for improving the performance of conventional tone mapping operators (TMO) by calculating both a contrast waste score and a contrast loss score for a first tone-mapped image produced by the TMO. The two contrast scores can be used to optimize the performance of the TMO by reducing noise and improving contrast. Algorithms for generating an HDR image by converting non-linear color space images into linear color space format, aligning the images to a reference, de-ghosting the aligned images if necessary, and merging the aligned (and potentially de-ghosted) images to create an HDR image. The merging can be performed with exposure fusion, HDR reconstruction, or other suitable techniques.

22 Claims, 26 Drawing Sheets
(17 of 26 Drawing Sheet(s) Filed in Color)

(56) References Cited

U.S. PATENT DOCUMENTS

| | | | |
|---|---|---|---|
| 8,817,120 B2* | 8/2014 | Silverstein et al. | 348/220.1 |
| 8,953,882 B2* | 2/2015 | Lim et al. | 382/168 |
| 9,025,867 B2* | 5/2015 | Cote et al. | 382/162 |
| 9,031,319 B2* | 5/2015 | Cote et al. | 382/167 |
| 9,092,838 B2* | 7/2015 | Barkan et al. | |
| 2011/0194618 A1 | 8/2011 | Gish et al. | |
| 2013/0129250 A1 | 5/2013 | Kokemohr | |
| 2013/0250113 A1 | 9/2013 | Bechtel et al. | |
| 2013/0322753 A1 | 12/2013 | Lim et al. | |
| 2013/0329093 A1 | 12/2013 | Zhang et al. | |
| 2014/0044372 A1 | 2/2014 | Mertens | |
| 2014/0079335 A1 | 3/2014 | Sun | |

* cited by examiner

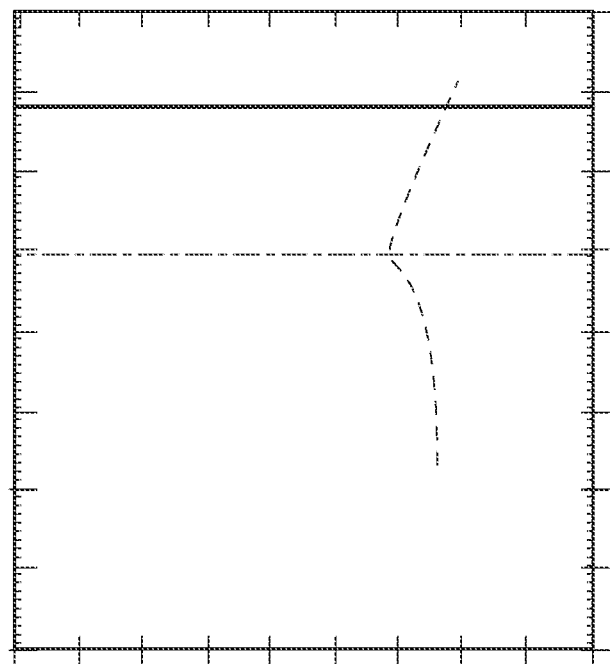
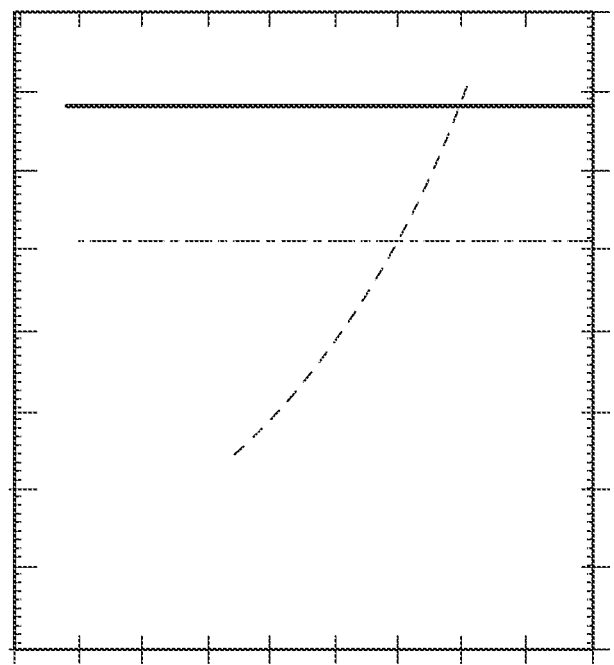
FIG.22

HIGH DYNAMIC RANGE AND TONE MAPPING IMAGING TECHNIQUES

CROSS-REFERENCE

This application is a non-provisional application that claims priority from U.S. Provisional Patent Application No. 61/869,875, filed on Aug. 26, 2013, and entitled "Robust and Content Aware High Dynamic Range Imaging," which is incorporated herein by reference in its entirety.

BACKGROUND

There are various challenges that exist with generating images that were originally captured in a variety of scenarios and environments, including low light levels, high noise, and high dynamic range (HDR) situations. The dynamic range in an imaging situation refers to the range of luminance values in the scene to be imaged. It can be expressed as the ratio of the greatest luminance value in the scene to the smallest luminance value in the scene. Most imaging systems are not capable of acquiring or capturing an HDR image with a single exposure. Thus, HDR images are typically computer-generated or generated from a combination of images captured at different times or with different exposure settings.

Once an HDR image has been created, it can be challenging to satisfactorily display the image in an electronic or printed medium. The challenge comes primarily from the lack of dynamic range in the electronic or print medium. This challenge is typically addressed with tone mapping operators (TMOs), which convert a range of luminance values in an input image into a range of luminance values that well matches the electronic or pre-print medium.

Further, there is a need to provide techniques and algorithms for improved tone mapping and for improved generation of HDR images.

It is against this background that the techniques and algorithms described herein have been developed.

SUMMARY

Disclosed herein is a computer-implemented method for improving the quality of an image. The method includes receiving an input image, utilizing a tone mapping operator (TMO) having one or more operational parameters to tone map the input image and create a first tone-mapped image, generating a contrast waste score for the first tone-mapped image, generating a contrast loss score for the first tone-mapped image, with a computer, automatically utilizing the contrast waste score and the contrast loss score to tune one or more of the operational parameters of the TMO, and utilizing the TMO with the one or more tuned operational parameters to generate a second tone-mapped image from the input image.

The contrast waste score may be representative of the amount of contrast in the first tone-mapped image that is used to represent noise. The contrast waste score may be generated by calculating a luminance difference between two adjacent pixels in the first tone-mapped image and multiplying that difference by the probability that the two adjacent pixels measure the same luminance. The luminance difference may be a normalized perceivable luminance difference.

The probability may be determined from a noise model of a camera used to capture the input image. The contrast loss score may be representative of the amount of contrast in the input image that is not mapped into the first tone-mapped image. The contrast loss score may be generated by comparing the loss of perceivable luminance differences with respect to a standard tone mapping procedure. The contrast waste score and the contrast loss score may be tuned by generating a confidence parameter from those two scores. The confidence parameter may be automatically adjusted or manually adjusted by a human operator.

Also disclosed is a computer-implemented method for generating an HDR image from a plurality of input images. The method includes, if one or more of the input images are not in a linear color space format, converting those to linear color space format, aligning the linear color space images to a reference, and merging the aligned and de-ghosted images to create an HDR image.

The images may be merged by fusing the images. The images may be merged by reconstructing the images. The reconstructing may include transforming the images to a common scale by applying the inverse of the camera response. The images on the common scale may be averaged on a pixel-by-pixel basis, with the under-exposed and over-exposed pixel values excluded from the average. The method may further include tone mapping the reconstructed image. The method may further include, for the case where the input images included RAW images, performing a sharpening operation. The method may further include de-ghosting the aligned images before the images are merged.

Also disclosed is a computer-implemented method for generating an HDR image from a plurality of input images. The method includes, if one or more of the input images are not in a linear color space format, converting those to linear color space format, for the case where the input images included linear color space images, performing a sharpening operation, aligning the linear color space images to a reference, and merging the aligned images to create an HDR image, the merging including reconstructing the images by transforming the images to a common scale by applying the inverse of the camera response.

The images on the common scale may be averaged on a pixel-by-pixel basis, with the under-exposed and over-exposed pixel values excluded from the average. The method may further include tone mapping the reconstructed image. The method may further include de-ghosting the aligned images prior to merging the images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 22 is an illustration of a gradient scale function for the Fattal et al. tone mapping operator

DETAILED DESCRIPTION

Figure 1:
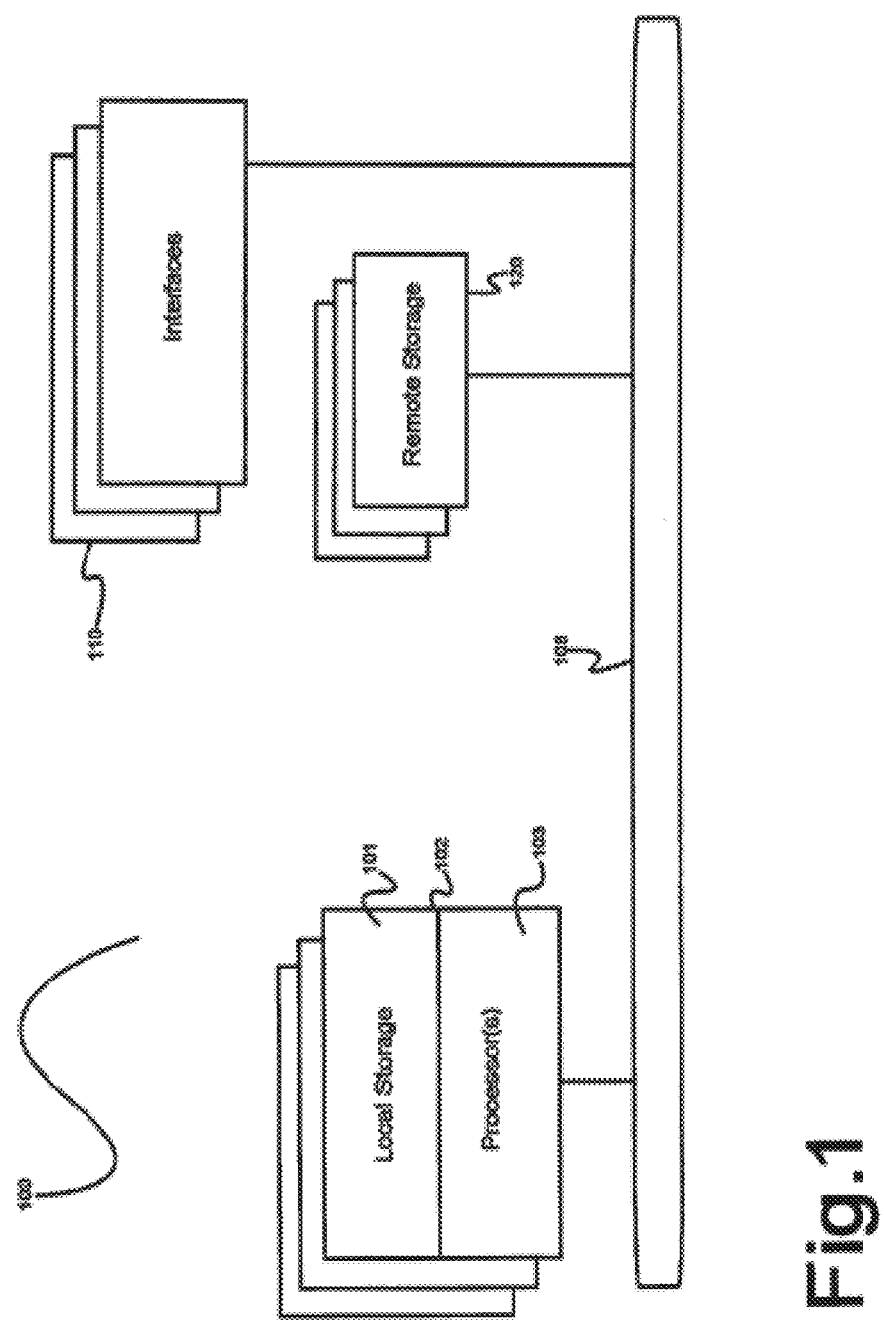
FIG. 1 is a block diagram illustrating an exemplary hardware architecture of a computing device used in an embodiment of the disclosure herein.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Figure 25:
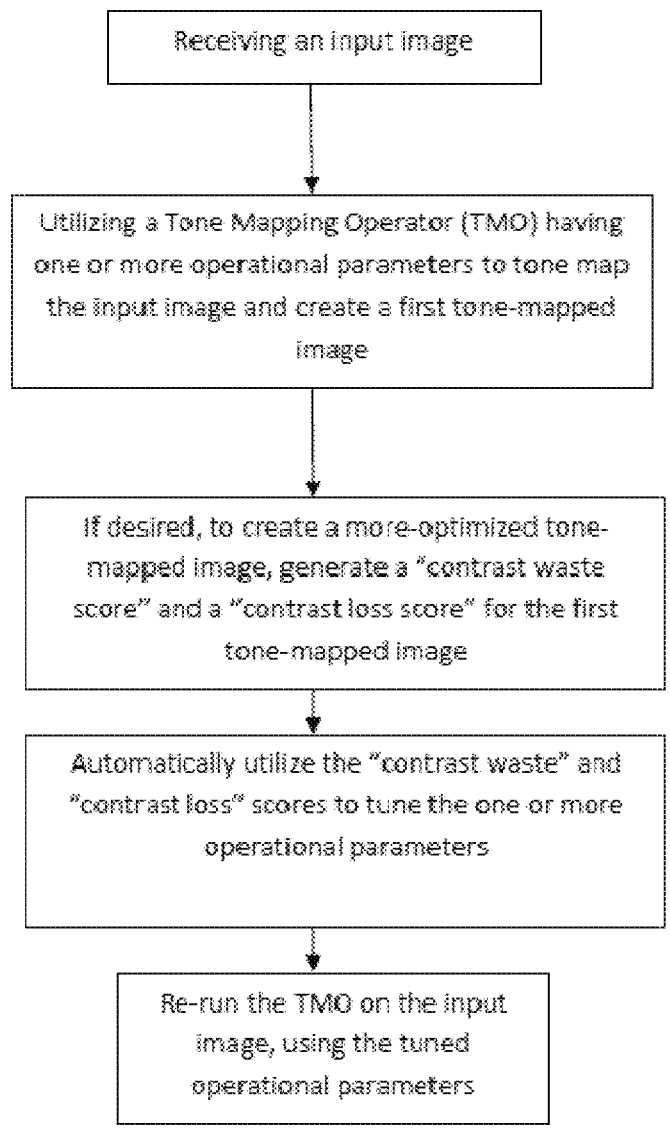
FIG. 25 is a flowchart showing the noise-aware tone mapping algorithm.

Generally, disclosed herein are improved techniques for improving the quality of images captured in low-light, high noise, and/or high dynamic range scenarios. A first technique, referred to herein as Noise-Aware Tone Mapping, and with reference to FIG. 25, relates to improving the operation of tone mapping operators (TMOs) that map an input image into a tone mapped image by calculating a contrast waste score representative of the amount of contrast in the tone mapped image that is a result of noise in the input image and calculating a contrast loss score representative of the amount of contrast in the input image that does not appear in the tone mapped image. The two contrast scores can be optimized so as to reduce the amount of noise in the tone mapped image while increasing the amount of contrast from the input image that appears in the tone mapped image. The two contrast scores can be combined into a single confidence parameter, which can be adjusted automatically or manually. The modification to the TMO can be performed by selecting two operational parameters of the TMO and adjusting them automatically to optimize the contrast scores.

Figure 26:
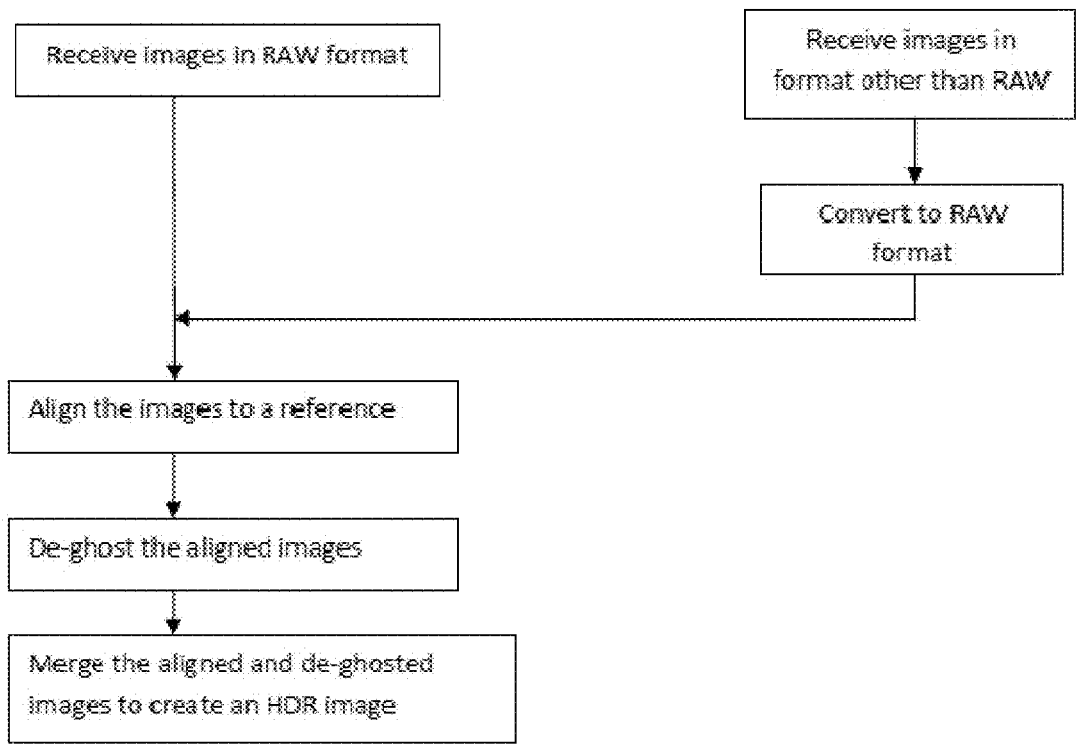
FIG. 26 is a flowchart showing the Robust and Content Aware HDR Imaging algorithm.

A second technique, referred to herein as Robust and Content Aware High Dynamic Range Imaging, relates to generating an HDR image from a plurality of input images. With reference to FIG. 26, if one or more of the input images are not in a linear color space format (e.g., RAW format, as but one example), the images are converted to a linear color space format. Then, the linear color space images are aligned to a reference, the aligned images are de-ghosted if needed, and the aligned (and potentially de-ghosted) images are merged to create an HDR image. The images may be merged by exposure fusion of the images or by HDR reconstruction of the images. The reconstructing may include transforming the images to a common scale by applying the inverse of the camera response. For the case where the input images included linear color space images, a sharpening operation may be performed.

Noise-Aware Tone Mapping

High dynamic range images taken under low light conditions usually contain a high amount of camera noise, which is often amplified by existing tone mapping operators. Disclosed herein is an approach that modifies tone mappers (including contrast enhancements to the camera's JPEG) to use the target contrast range optimally while suppressing the amount of visible noise. This is achieved by incorporating models of camera noise and human contrast perception into the tone mapping process. The improved tone mapping operators can be safely applied to low-light images.

High dynamic range (HDR) images can nowadays be captured more easily than with previous cameras. Many current digital cameras are equipped with sensors that capture, in a single shot, a much larger brightness range than most display devices can reproduce. To properly view this HDR content on such low dynamic range displays, one often needs a tone mapping operator (TMO) that maps the HDR content to the limited displayable range, while retaining as much of its original contrast as possible [Reinhard et al, 2010]. The sheer number of different algorithms proposed in the literature is testament to the complexity of this task: they must adapt to different displays, be free of visual artifacts, and provide intuitive artistic controls to allow users to achieve their desired visual styles.

Despite these challenges, today's powerful tone mapping operators have been very successful and have found their way into a wide variety of consumer photography applications used by professionals and amateurs alike. However, experimenting with them makes one quickly notice that while they work remarkably well on images taken under daylight conditions or in well-lit indoor scenes, they often produce very objectionable artifacts on images taken under low light conditions. For example, outdoor shots taken at night or at dawn with poorly illuminated backgrounds, or indoor shots where large parts of a scene are scarcely lit, are currently not well handled by existing TMOs because they contain significant sensor noise. This noise, indistinguishable from real signal to the tone mapping algorithm, artificially creates contrast in the original image. The algorithm then does its best to preserve the artificial contrast in the output.

It can be important to understand the difference between image filtering and contrast optimization in tone mapping. Tone mapping operators enhance details but also image noise. Pre-filtering the images, even with noise-optimal filters, cannot eliminate noise completely without removing image details. The approach disclosed herein does not require filtering; instead, noise is detected and masked below a perceivable level.

Disclosed herein is a principled way of making both local and global tone mapping operators robust to noise in situations where it is prevalent, such as in low light conditions. In particular, we show how the tone mapping curve of any such operator can be modified in order to reduce the presence of noise in the output image. Our method maintains the visual style desired by the user and assigns the noise-free range of available pixel values, while wasting as little of the output range as possible to display perceivable camera noise.

In order to achieve this goal, we incorporate a theoretical model of camera noise with a model of human perception into existing tone mapping algorithms and propose two main contributions. First, we introduce a new theoretical quantitative measure to estimate how effectively a tone mapper utilizes the available output (display) range to preserve the original contrast while keeping the noise visually imperceptible. This measure is based on a new contrast waste score and a new contrast loss score which quantifies a TMO's performance with respect to the above competing goals. Second, we show how a tone mapping curve can be modified to optimally use the available contrast range without revealing noise. We look at luminance differences (i.e., the gradient) between adjacent pixels in the input image. If that difference is likely due to noise, under the theoretical model, then it should be mapped to a difference that is visually indistinguishable in the output result. We modify the curve according to that constraint while staying as close as possible to its original shape. As opposed to filtering the input signal by taking the noise model into account, our approach does not modify the input signal. Accordingly, our method does not inadvertently introduce additional artifacts (such as oversmoothing), as existing filtering techniques so commonly do. Furthermore, noise-aware tone mapping controls both noise and target contrast together, whereas filtering alone is agnostic to the latter.

Tone mapping has been an active research topic in computer graphics for nearly two decades. In this section, we discuss the tone mapping operators relevant to our work. For a detailed treatment of the current state of tone mapping research we refer the reader to Reinhard et al [2010].

Early work in image tone mapping involved analyzing common practices of film development and applying them to the field of HDR imaging. Reinhard et al. [2002] proposed applying a sigmoidal response curve globally and performing local operations to mimic photographic dodging and burning. While this operator comprises local components, its results are often a faithful reproduction of the original scene's contrast and colors as it would be experienced by a human observer. A different look with higher local contrast can be achieved using a bilateral filtering based tone mapping approach [Durand and Dorsey]. The main idea of this method is to produce a base layer from the input HDR image through bilateral filtering. A corresponding detail layer is computed by the ratio of the original HDR and the base layer. Tone mapping is achieved by applying a compressive tone curve to the base layer and combining the result with the detail layer. Reinhard and Devlin [2005] proposed a TMO that is inspired on the photo receptors response in the human eye. The parameters simulate in part the behavior of the human visual system with respect to global and local adaptation to the overall luminance and particular chrominance in the image.

While there are numerous other tone mapping operators, in this work we focus on the Photographic TMO [Reinhard et al 2002] and the Bilateral TMO [Durand and Dorsey 2002] as two prominent representatives of global and local tone mapping operators.

The noise properties of digital cameras have been extensively studied in the field of optics and photonics [Janesick 2001]. The two principal noise sources are shot noise, associated with the process of light emission, and readout noise, which is an umbrella for several sources that affect the image capturing process. These two sources affect each pixel individually. In this disclosure, we apply a simplified noise model that takes into account these major sources and ignores other spatially dependent sources. The parameters of this model can be recovered from a set of calibration images [Janesick 2001] or from regularly captured images [Granados et al 2010; Liu et al 2008]. In this disclosure, we assume that a calibrated camera noise model is available. In the next sections, we explain how this model can be used to measure the image quality of existing tone mapping operators, and how it enables noise-aware TMOs with greatly enhanced performance on low light images.

We begin by describing an approach to measure the effectiveness of a TMO in allocating the available display contrast when tone mapping a high dynamic range image. This is a challenging task that becomes more difficult in situations where noise is dominant, such as low light conditions. In these cases, existing tone mapping operators may inadvertently boost the noise in the image, which leads to very objectionable artifacts. We argue that an effective use of the contrast range means succeeding at two potentially conflicting tasks, preserving the original contrast of the input image while preventing the amplification of noise. In this section, we describe the camera noise model and the visual perception model that are the foundation of our work. Based on these models, we introduce two new quality measures to assess the performance of a TMO: i) contrast waste and ii) contrast loss scores.

By calibrating the noise parameters of a given digital camera, it is possible to predict the noise distribution of the color values in the images it captures. Camera noise calibration is fundamental if we are to evaluate the effectiveness of TMOs in handling image noise because knowing the noise distribution at every pixel is required.

To estimate image noise, we can apply the [Granados et al 2010] method to the raw output of digital cameras. This calibration needs to be performed once, offline, for a given camera model; it could also be provided by the manufacturer. After camera calibration, we obtain a noise model defined by camera-dependent and photograph-dependent parameters. The four camera-dependent parameters are the camera gain at reference ISO level $G_{100}$, the black level $v_{min}$, the saturation level $v_{max}$, and the readout noise $\sigma_R$. The two photograph-dependent parameters are the ISO value S and the exposure time t. We can approximate the variance of the Gaussian probability distribution for a pixel p in an input image I at the ISO level S as [Janesick 1985]:

$$\sigma_I^2(p) \approx G_s(I(p) - v_{min}) + \sigma_R^2, \qquad \text{EQ 1}$$

where $$G_s = \frac{S}{100} G_{100}$$

is the camera gain at ISO level S.

This model predicts the noise distribution in raw images, which have a higher bit depth than standard 8-bit displays. In addition, this model can be used to predict the noise of HDR images that are obtained from averaging raw multi-exposure sequences. Let $I=\{I_1, \ldots, I_n\}$ be a multi-exposure sequence with exposure times $t_i$ and ISO values $S_i$. Each image $I_i$ provides the irradiance estimate:

$$X_i(p) = \frac{I(p) - v_{min}}{G_{si} \cdot t_i}, \quad \text{EQ 2}$$

with variance $$\sigma_{x_i}^2 \approx \frac{\sigma_{I_i}^2(p)}{(G_{si} \cdot t_i)^2}. \quad \text{EQ 3}$$

An irradiance map, or HDR image, X can be obtained from the weighted average $$X(p) = \frac{\sum_i w_i(p) X_i(p)}{\sum_i w_i(p)}, \quad \text{EQ 4}$$

with variance $$\sigma_x^2(p) = \frac{\sum_i w_i(p)^2 \sigma_{x_i}^2(p)}{\left(\sum_i w_i(p)\right)^2}. \quad \text{EQ 5}$$

In the remainder of the disclosure, we assume that the input image I and its variance $\sigma_I^2$ are known or recovered using a similar calibration procedure. We discontinue the use of X and use only I instead.

Let the input image be a high dynamic range image $I:\Omega \to \mathbb{R}$ where each pixel p is an observation of a random variable that follows a Gaussian distribution with mean $\hat{I}(p)$ and standard deviation $\sigma_I(p)$ estimated with the camera noise model described in Sec. 3.1. Let $p,q \in \Omega$ be two adjacent pixel locations, and let $D(p,q)=I(p)-I(q)$ be an approximation of the image derivative at $\hat{I}(p)$. $D(p,q)$ also follows a Gaussian distribution with mean $\hat{D}(p,q)=\hat{I}(p)-\hat{I}(q)$ and standard deviation $\sigma_D(p,q)=\sigma_I(p)+\sigma_I(q)$. Whenever the image is flat at $I(p)$, $\hat{I}(p)=\hat{I}(q)$, the mean of the derivative's distribution is zero. Therefore, to test whether the observed derivative is caused by noise we define the null hypothesis $H_0$ and the alternative hypothesis $H_1$ as:

$H_0$: The observed derivative $D(p, q)$ is generated by the distribution $N(0, \sigma_D(p, q))$, and $H_1$: The observed derivative $D(p, q)$ is not generated by the distribution $N(0, \sigma_D(p, q))$.

The probability of rejecting the null hypothesis $H_o$ incorrectly (type I error) should be bounded by a confidence value $\alpha$ as:

$$Pr(\text{rejecting } H_0 | H_0 \text{ is true}) = Pr(Z > |z_D(p,q)|) < \alpha, \quad \text{EQ 6}$$

where Z is a random variable with Normal distribution, and $$z_D(p, q) = \frac{D(p, q)}{\sigma_D(p, q)}$$

is the statistical standard score or z-value of the observed derivative. The probability in Eq. 6 captures the percentage of derivatives due to noise that are larger than $D(p,q)$. Since our goal is to misclassify as few derivatives due to noise as possible, the confidence value $\alpha$ is set to an arbitrary low value (e.g., 1%). If the probability of observing a derivative larger than $D(p,q)$ is larger than a, we reject the alternative hypothesis and accept that that $D(p, q)$ is generated by the distribution of the image noise. The result of this test is encoded in a mask image:

$$M(p,q)=1_{\{Pr(Z>|zD(p,q)|)>\alpha\}} \quad \text{EQ 7}$$

that assigns the value of 1 to derivatives $D(p,q)$ that are attributable to camera noise.

Our visual perception model consists of a predictor that tests if two intensities are visually indistinguishable to the observer. We use the Daly visual difference predictor (VDP). Let $I^t$ be a tone mapped version of the input image I. Assuming a standard display with sRGB response function $\gamma \approx 2.2$, and luminance range $(L_{min}, L_{max})$, we construct the image $I_L^t=(I^t/\max(I^t))^{1/\gamma} \cdot (L_{max}-L_{min})+L_{min}$ whose values approximate the luminance emitted by the display. For each value $I_L^t$ the contrast sensitivity function csf $(L)=\Delta L$ predicts the minimum luminance offset $\Delta L$ from an observed luminance L that is necessary for the difference to be perceivable in 75% of the cases under standard illumination and adaptation conditions. This threshold is frequency dependent, therefore, we chose a low frequency that represents the contrasts between adjacent pixels in the image. Based on the contrast sensitivity function, the probability $V(p, q)$ that a user detects a luminance difference is:

$$V(p,q)=(1-\exp(-|\beta z(p,q)|^3), \text{ where} \quad \text{EQ 8}$$

$$z(p,q)=(|I_L^t(p)-I_L^t(q)|)(\max\{csf(I_L^t(p)), csf(I_L^t(q))\})^1, \text{ and} \quad \text{EQ 9}$$

$$\beta=(-\log(1-0.75))^{1/3} \text{[Aydin et al 2008]}.$$

Figure 4:
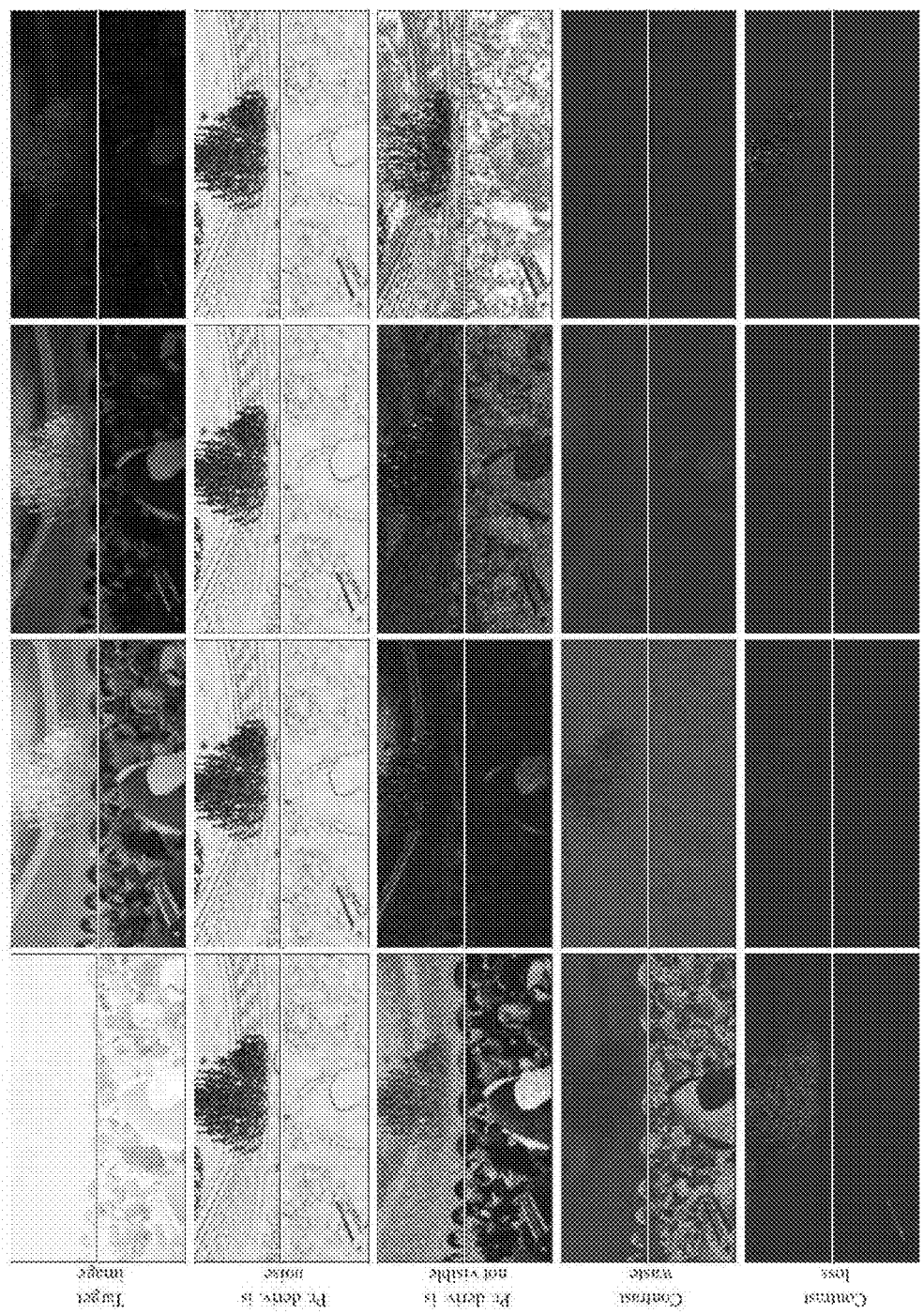
FIG. 4 illustrates examples of contrast waste score maps and contrast loss score maps for four different settings of a tone mapping operator.
Figure 5:
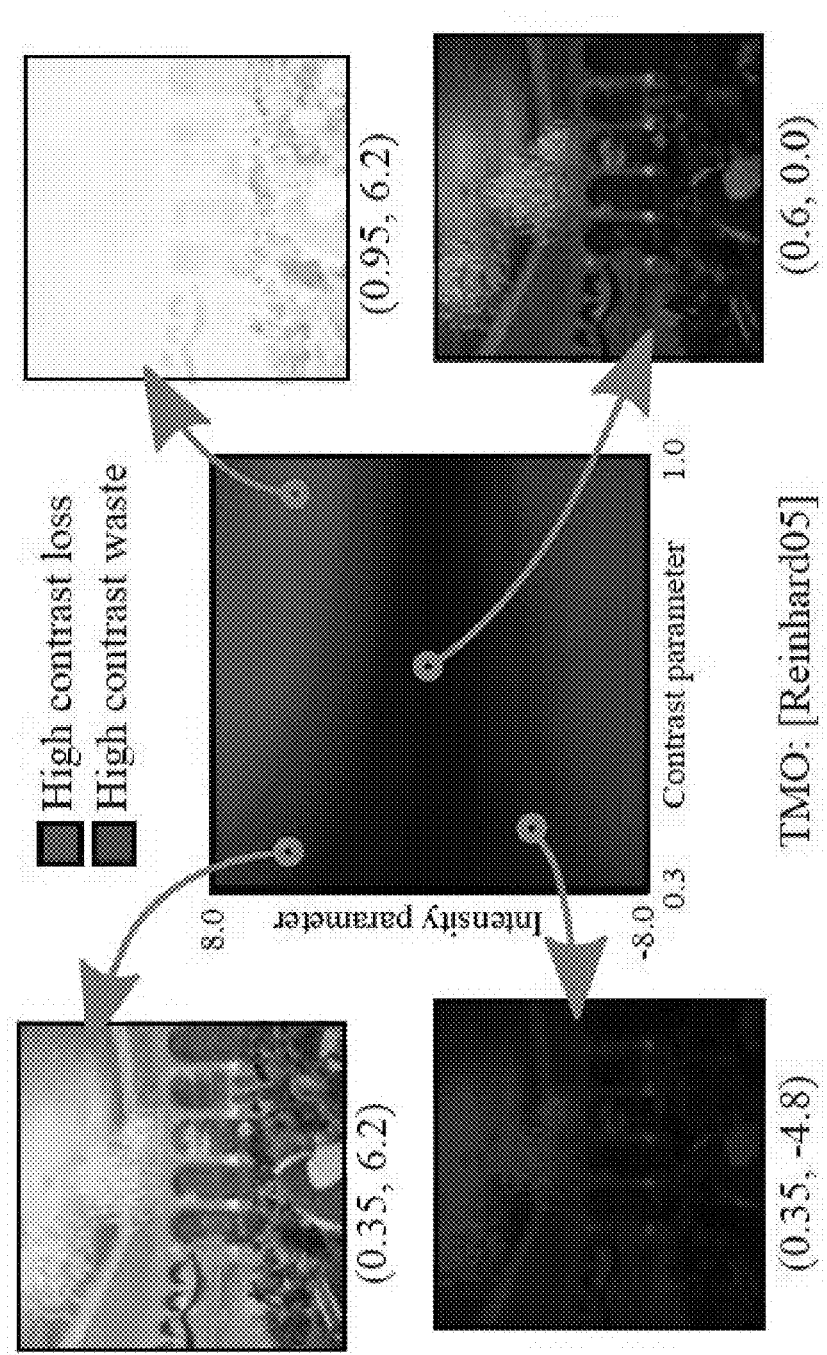
FIG. 5 is an illustration of contrast scores for different configurations of the TMO.

FIG. 4 shows examples of the contrast waste and contrast loss score maps for three different settings of the Reinhard/Devlin tone mapping operator. Each row shows a top and bottom crop of the photograph shown in FIG. 5. High contrast loss (last row) occurs at pixel locations where the real image derivatives (darker pixels in 2nd row) are no longer perceivable (bright pixels in 3rd row). High contrast waste (4th row) occurs whenever derivatives attributable to noise are displayed in the tone mapped image.

The aim of the contrast waste score is to measure how much contrast, defined as the visible luminance differences in the displayed image, is used by a tone mapping algorithm to display color values that are indistinguishable under noise. Given a tone-mapped image $I^t$, the score for a pair of adjacent pixels p, q is defined as the normalized perceivable luminance difference between the pixels times the probability that both pixels measure the same luminance:

$$W(p,q)=M(p,q)V(p,q)|I_L^t(p)-I_L^t(q)|. \quad \text{EQ 10}$$

The contrast waste score for a tone mapped image $I^t$ measures how many pairs of adjacent pixels whose colors in the input image are indistinguishable under noise are mapped to screen values whose luminance are likely to be detected by the user. The amount of wasted luminance differences per image is represented by the average per-pixel waste score, $$\overline{W} = \frac{1}{|N(\Omega)|} \sum_{p,q \in N(\Omega)} W(p, q), \quad \text{EQ 11}$$

where N is an 8-neighborhood system in the image domain $\Omega$. FIG. 4 (4th row) illustrates the contrast waste produced by the same tone mapper with different parameters. We used the Reinhard/Devlin 2005 TMO.

The aim of the contrast loss score is to estimate how many luminance differences are missing in a tone mapped version $I^t$ of an image I. This loss of contrast occurs at image locations whose derivatives are not attributable to noise, according to the image noise model, but their corresponding tone mapped values are visually indistinguishable. We compute the contrast loss score at a pair of pixels p, q by measuring the loss of perceivable luminance differences in the tone mapped image with respect to a standard tone mapping procedure, such as a linear intensity mapping. This score is defined as $$L(p,q)=(1-M(p,q))(1-V(p,q))|I^r(p))-I^r(q)|, \quad \text{EQ 12}$$

where $I^r$ is a reference tone mapping of I, such as $I^r(p)=(I(p)/\max(I))$. Similar to contrast waste, the aggregate contrast loss score for an image is computed as the average per-pixel loss score, $$\bar{L} = \frac{1}{|N(\Omega)|} \sum_{p,q \in N(\Omega)} L(p,q). \quad \text{EQ 13}$$

FIG. 4 (last row) shows the contrast loss produced by the Reinhard/Devlin 2005 TMO with different parameters.

The contrast waste and loss scoring functions can be used to guide the choice of TMO for a given scene. They can also guide a user to set the parameters of a given operator to achieve a preferred style and contrast with minimal noise.

To tone map an HDR image, users must choose a TMO and its parameter values p. Because operators can produce noise artifacts for a range of configurations (see FIG. 4, top), the selection process requires trial and error. Furthermore, the chosen operator and its parameters may not generalize well to other cameras or scenes. Accordingly, providing users with a tool that allows them to navigate the space of TMOs and their parameters in a quick and intuitive manner would be beneficial. We can take advantage of our contrast loss and contrast waste quality scores, to provide the user with information regarding the suitability of different parameter values of a TMO, and even suggest noise-optimal values.

We created a graphic user interface (GUI) for visualizing and intuitively navigating the parameter space of TMOs. The GUI has two pop-up menus, an interactive 2D plot of the parameter space, a push-button and a display panel. The pop-up menus allow the user to select a TMO and two of its parameters. The interactive 2D plot gets populated according to the current selections. Each axis corresponds to one of the selected parameters. Contrast waste and loss scores are computed for a discrete set of parameter combinations that are representative of the space. The contrast waste score is assigned to the blue RGB channel of the plot and the contrast loss to the red (see FIG. 5). The central plot shows a color map of the contrast waste and loss scores obtained for every combination of two parameters of the TMO, contrast and intensity. Low scores correspond to values close to black. Noise is more apparent in the images with high contrast waste (top left), whereas images with high contrast loss look washed out (bottom left). Images with high contrast waste and loss scores look noisy and flat (top right). When values for both scores are low, we see images that make an optimal utilization of the available display contrast (bottom right). By clicking on the 2D plot, the user can select values for the TMO's parameters and the corresponding tone mapped image is presented in the display panel. The color coded 2D plot allows the user to visualize parameter combinations that yield high contrast waste (bright blue), high contrast loss (bright red), or optimal behavior (black). The push-button in the GUI automatically selects the optimal parameter values with respect to contrast waste and loss.

By design, our scores assess effective contrast preservation and noise suppression for the current image. Consequently, they are not an absolute measure of image quality or user preference. Both image quality and subjective preference are results of complex and highly subjective cognitive processes. As such, formulating metrics that cover their every aspect is highly challenging, if at all possible. That said, practical metrics that achieve even some level of correlation with these complex tasks are useful in practice, the SSIM metric for image quality assessment is a good example. Our measures go into a similar direction by simplifying a highly challenging task and offering a practically useful estimate.

The contrast waste and contrast loss scores discussed above can guide the selection of a tone mapping operator and its parameters for a given image. However, there is currently no method in the literature to ensure that the image produced by a TMO contains as few as possible noise artifacts. In this section, we propose a principled approach to reduce the perceivable noise produced by established tone mapping operators. Our approach works by explicitly avoiding the conditions where contrast waste and contrast loss occur in tone mapped images, at the expense of allowing deviations from the original contrast distribution of the image. Larger reductions in contrast waste loss imply larger deviations from the original tone mapped image. Because our contrast scores depend on the specified confidence levels for noise detection, the user can control the trade-off between fidelity to the original tone mapped image and the amount of noise visible by tuning a single confidence parameter.

We define a noise-optimal tone mapping operator as one that minimizes both the contrast waste and the contrast loss scores. We use the following two predicates to represent the conditions under which contrast waste and loss occur:

$$\text{isNoisy}(p,q)=(|I(p)-I(q)|)(\sigma^2_I(p)+\sigma^2_I(q))^{1/2}$$

$$\text{isVisible}(p,q)=|I^r(p)-I^r(q)| \geq \max\{csf(I_L^r(p)), csf(I_L^r(p))\},$$

for a pair of adjacent pixels p, q and a given confidence value $z_\alpha$. Contrast waste occurs when the TMO assigns different perceivable luminance levels to two image values, p and q, that are the same but corrupted by noise, $$\text{contrastWaste}(p,q)=\text{isNoisy}(p,q) \wedge \text{isVisible}(p,q). \quad \text{EQ 14}$$

Conversely, contrast loss occurs whenever the TMO assigns the same perceivable luminance level to image values that are different under the image noise distribution, $$\text{contrastLost}(p,q)=\neg \text{isNoisy}(p,q) \wedge \neg \text{isVisible}(p,q). \quad \text{EQ 15}$$

Therefore, we declare a tone mapping operator as noise-optimal if it hides contrast caused by noise while at the same time ensuring that the real contrast remains visible:

$$(\forall_{p,q} \in N(\Omega))(\text{isVisible}(p,q) \Leftrightarrow \neg \text{isNoisy}(p,q)). \quad \text{EQ 16}$$

We now demonstrate how the noise-optimality condition (Eq. 16) can be enforced in existing tone mapping operators. We show this modification for local and global tone mapping operators, but restrict ourselves to those that use a single tone curve to map the luminance channel (e.g., [Durand and Dorsey 2002; Reinhard et al. 2002; Reinhard and Devlin 2005]). Other tone mapping strategies, such as gradient-domain methods [Fattal et al. 2002], could benefit from our modifications by following approaches similar to ours. First, we will construct a tone curve that is noise-optimal by design. Then, we present an algorithm that adjusts any tone curve to approximate the noise-optimal curve. The level of approximation can be controlled by the user.

Let $C: v \rightarrow [0, 2^{bpp}-1]$ be the tone curve that converts luminance values v in the input image to target digital values or luminance values in the display. We assume that digital values in the target space are luminance values. Therefore, we use both terms interchangeably. From Eq. 14 and Eq. 16, one can derive that a noise-optimal curve C* satisfies the predicate $$C^*(v_{i+1}) - C^*(v_i) \geq csf(C^*(v_i)) \Leftrightarrow \frac{v_{i+1} - v_i}{\sigma_{v_{i+1}}^2 + \sigma_{v_i}^2} \geq z_\alpha \qquad \text{EQ 17}$$

for a pair of adjacent luminance values $v_{i+1}$, $v_i$ under a given discretization of the continuous luminance range. As in the definition of the scores, $z_\alpha$ determines the confidence value of the hypothesis test. For $z_\alpha=1$, 15.9% of truly different luminance differences $|v_i-v_{i+1}|$ will be mapped to the same display luminance; for $z_\alpha$: =2, only 2.3% will. Note that the inequality $|C(v_{i+1})-C(v_i)| \geq csf(C(v_i))$ in Eq. 17 allows the tone mapper to assign arbitrarily large display luminance differences to non-noisy contrasts, which can produce banding artifacts in the final image. It is difficult to analytically predict what allowable target luminance differences will introduce perceivable banding artifacts. Therefore, we follow a conservative approach that guarantees that these artifacts are prevented, and replace the inequality by an exact equality. With this modification, EQ. 17 directly provides a first order approximation of the derivative of the optimal tone curve:

$$\frac{\partial C^*(v_i)}{\partial v_i} \approx C^*(v_{i+1}) - C^*(v_i) \qquad \text{EQ 18}$$
$$= (csf(C^*(v_i)))(v_{i+1}-v_i))(z_\alpha(\sigma_{v_{i+1}}^2 + \sigma_v^2)^{1/2})^{-1}$$

Figure 6:
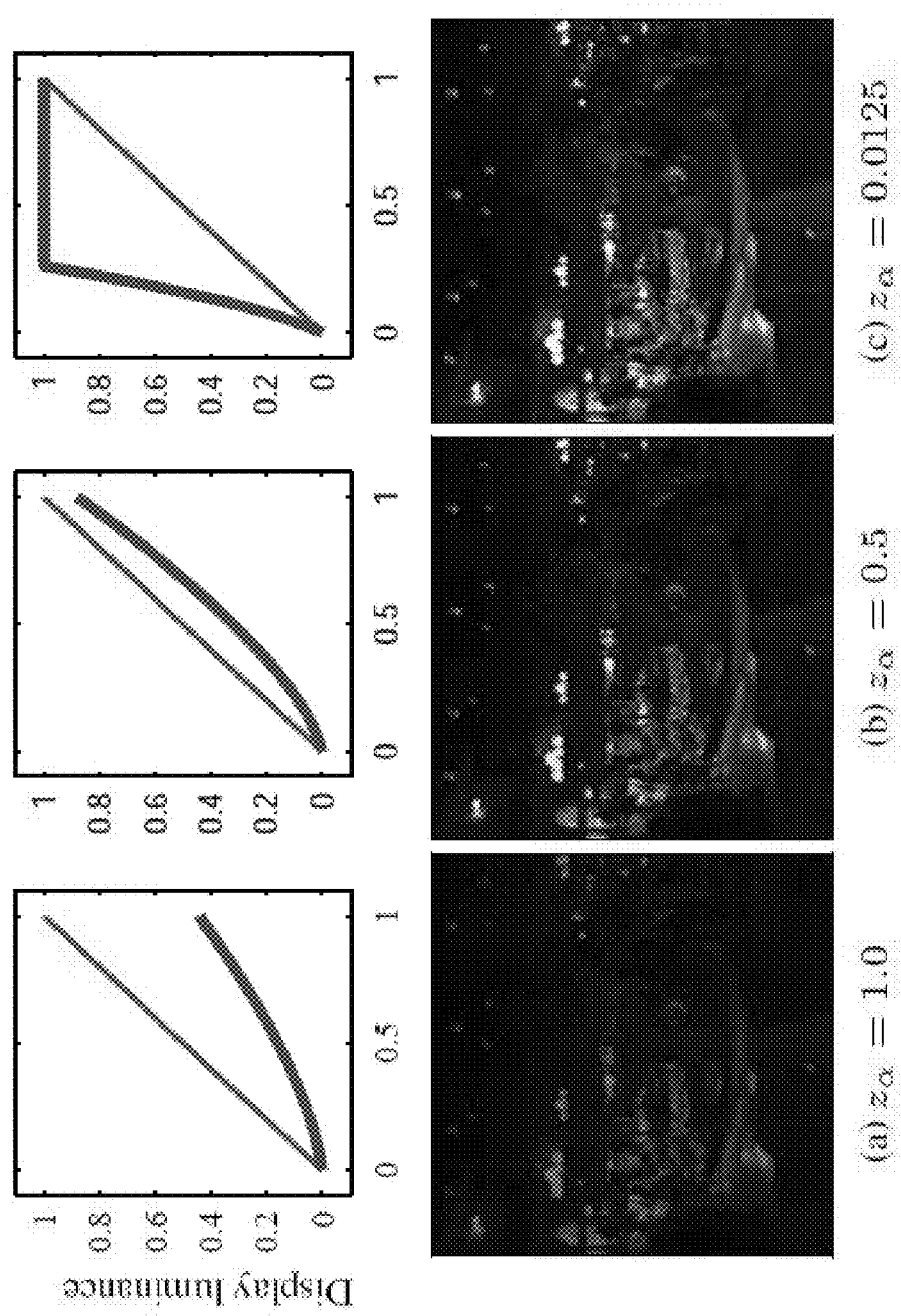
FIG. 6 is an illustration of noise-optimal tone curves for different confidence values.

We obtain the optimal tone curve at a given confidence (see FIG. 6) by encoding these derivative constraints and the boundary condition $C^*(0)=0$ in a linear system of equations and solving using least-squares regression. In FIG. 6, the optimal curve (blue) maps input luminance to display luminance. The mapping is performed such that input values that are different given the image noise distribution, for confidence values cease about five, are mapped to display values that are visibly distinguishable according to a perceptual model. The bottom row shows how the contrast of the image and the noise visibility increase for smaller confidence values of the optimal curve. Following the camera-dependent and image-dependent parameters of our noise model, a noise-optimal curve is computed for a given camera and ISO level, for a single raw image; or for a sequence of ISO levels and exposure times for HDR images from exposure stacks.

The noise-optimal curve C* at a given confidence level is guaranteed to behave optimally from the perspective of noise suppression. However, using it directly for dynamic range compression has two disadvantages. First, C* might not make use of the whole dynamic range of the display. For instance, when the maximum value in the range of C* is lower than the maximum display luminance. Second, C* is fixed for each photograph or, more specifically, fixed for each combination of camera, ISO level(s), and possibly exposure times. In general, C* does not assign the same luminance values as the desired tone mapping curve C(p) for values p of the TMO's parameters (henceforth we omit p for better readability). Accordingly, the resulting image, while noise-optimal, may be different in contrast and appearance from the result with C.

To address these disadvantages, our aim is to construct an approximated noise-optimal curve C' that preserves the target luminance values of C and the noise-optimal property of C* (Eq. 17). The curve C' is defined as the minimum of the cost function $$\varepsilon(C') = \sum_{vi} g(v_i)(C'(v_i))^2 + \qquad \text{EQ 19}$$
$$\sum_{vi} h(v_i)\left(\frac{\partial C'(v_i)}{\partial v_i} - \frac{\partial C^*(v_i)}{\partial v_i}\right)^2 + \sum_{vi}\left(\frac{\partial^2 C'(v_i)}{\partial v_i}\right)^2$$

The first term penalizes with weight g(·) the deviations from the luminance of the original curve C. The second term penalizes with weight h(·) the gradients of the noise-optimal curve C*. Finally, the third term penalizes curves that are non-smooth in order of prevent artifacts such as banding. The first two terms are antagonistic and cannot be optimal simultaneously. Therefore, we propose two weighting criteria that exploit the specific content of an image to enable pleasing results. First, it is more important that luminance and gradient constraints are satisfied for luminance values v, that are more frequent in an image, than for those that are less frequent. In other words, a small amount of contrast loss and waste can be tolerated at luminance values that are rare. Second, because perceivable noise degrades image quality, we chose to abide by the noise constraints whenever they conflict with the luminance constraints. We now encode the two criteria as weights. Let $F(v_i)$ denote the log frequency of the luminance value $v_i$ in the input image. Then $h(v_i)=1_{\{F(v_i) \geq \overline{F}\}}$ and $g(v_i)=1-h(v_i)$. Here, $\overline{F}$ is the mean log frequency of luminance values in the image. We empirically determined this to be a good content-dependent threshold for the importance of target luminance preservation of C. The weights enforce the noise-optimal gradients for frequent luminance values in the input, and penalize deviations from the original tone curve for infrequent values.

Figure 7:
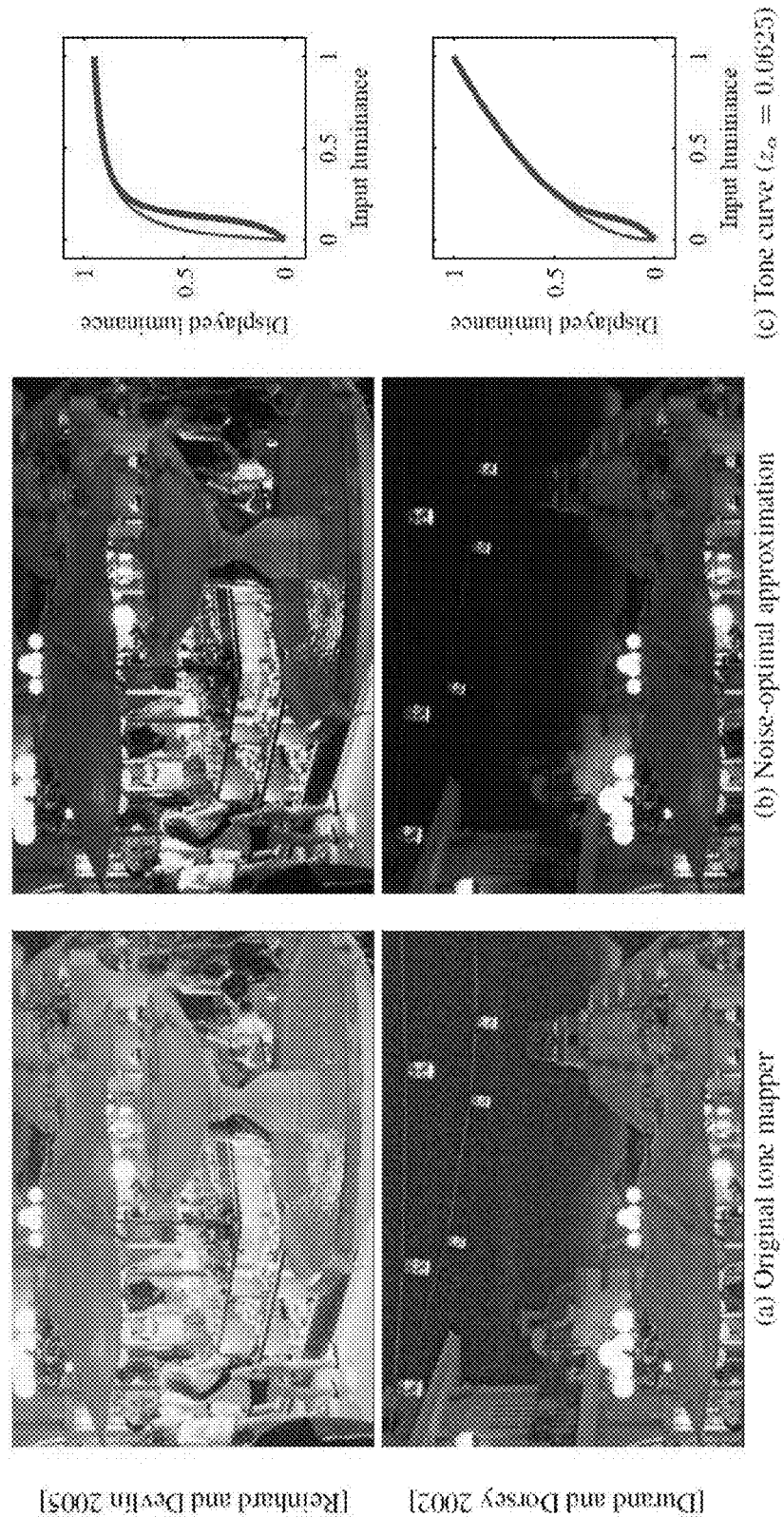
FIG. 7 is an illustration of examples of noise-optimal approximations for two existing TMOs.

We employ a simple and efficient greedy algorithm to find the approximated noise-optimal curve C' described by Eq. 19 (see Algorithm 1). The inputs to the algorithm are a histogram of the luminance levels in the input image in log scale F, the noise-optimal tone curve C* according to the user-controlled confidence $z_\alpha$ and the user-controlled parameters p that define the desired tone curve $C(\rho)$. First, the algorithm steps through the luminance range to compute the target gradients of C'. To this end, it reduces the gradients of C if they are larger than the gradients of the optimal curve C* and if the current luminance level is frequent in the image. Whenever possible, for infrequent luminance values, it adds back the amount of target luminance difference that may have been reduced earlier in the loop for frequent luminance values. Similar to C* (see Sec. 4.2), the final curve C' is reconstructed from the target gradients by solving a linear least squares system, with the additional smoothness constraint $$\sum_{vi}\left(\frac{\partial^2 C'(v_i)}{\partial v_i}\right)^2 = 0,$$

and the boundary condition C'(0)=C(0) (see FIG. 7). FIG. 7 shows the original tone curve applied by the tone mapper (right column, red) used as a reference to construct an approximation of the noise-optimal curve (right column, blue). This approximation makes more efficient use of the display by reducing the contrast assigned to noisy derivatives while ensuring that enough contrast is assigned to the true variations of the signal. In our experiments, users preferred our approximated result.

---

Algorithm 1: Approximation of noise-optimal tone curves.

Data: Noise-optimal tone curve C* at confidence $z_\alpha$
Data: Desired tone curve C acc. to user parameter $\rho$ of TMO
Data: Histogram F of the input image in log-scale
Reslt: Approximated noise-optimal curve C'
debt ← 0
for every luminance value $v_i$ in the input image range do
   if
$$\frac{\partial C(v_i)}{\partial v_i} > \frac{\partial C^*(v_i)}{\partial v_i} \text{ and } F(v_i) > \bar{F} \text{ then}$$
$$debt_i \leftarrow \frac{\partial C^*(v_i)}{\partial v_i} - \frac{\partial C(v_i)}{\partial v_i}$$
$$\frac{\partial C'(v_i)}{\partial v_i} \leftarrow \frac{\partial C^*(v_i)}{\partial v_i}$$
   debt ← debt + $debt_i$
   else
$$surplus_i \leftarrow \frac{\partial C^*(v_i)}{\partial v_i} - \frac{\partial C^*(v_i)}{\partial v_i}$$
   if $F(v_i) > \bar{F}$ then
     $pay_i$ = min {$surplus_i$, debt}
   else
     $pay_i$ ← debt
   end
$$\frac{\partial C'(v_i)}{\partial v_i} \leftarrow \frac{\partial C(v_i)}{\partial v_i} + pay_i$$
   debt ← debt − $pay_i$;
   end
end

---

The algorithm for creating approximated noise-optimal curves can be applied to any tone mapping operator that uses a single tone curve. This enhances the TMO's performance because it leads to drastic noise reduction, in particular on images under low light conditions, while allowing the user to control the compromise between contrast preservation and noise visibility through a single additional parameter. To illustrate this, we modified two well-established global operators [Reinhard et al. 2002; Reinhard and Devlin 2005] and a well-established local operator [Durand and Dorsey 2002). To modify each operator, we intercept the process of luminance mapping and modify it to use the approximated noise-optimal curve instead of the original curve. The rest of the TMO's algorithm is left unmodified.

Reinhard and colleagues [2002; 2005] propose tone curves that compress high-luminance values more and that approximate the response of the photoreceptors in the human eye, respectively. The first operator has two parameters: white point (luminance value at which saturation occurs) and key value (middle gray level of the image). The second operator has four parameters: contrast, intensity, chromatic adaptation, and light adaptation. After disabling the local adaptation features of each algorithm, dodging and burning and chromatic adaptation, respectively, the operators correspond to the application of a single curve to the luminance channel, which we replace by its approximated noise-optimal version. These local adaptation features do not improve the contrast utilization and in some scenarios could emphasize noise (e.g., for dodging and burning). Therefore, disabling them does not deter their performance when comparing them with their noise-optimal approximations.

The algorithm by Durand and Dorsey [2002] works in three steps. First, the input image is split into a base layer and a detail layer, each containing the low and high frequencies, respectively. Second, the dynamic range of the base layer is compressed. Finally, the compressed base layer and the detail layer are combined to produce the final result. The method expresses the detail layer as a factor of the base layer before compression. This feature makes it particularly prone to noise artifacts in low light conditions, even for conservative parameter settings, as the image noise is stored in the detail layer alongside the true high frequencies of the image. Although it is possible to directly filter the detail layer, we obtained better results by compressing the base using the approximated noise-optimal curve. This is because noisy details often remain below the perceivable luminance difference if the corresponding luminance in the base layer values is identical.

The three TMOs described can produce severe noise artifacts for a wide range of parameter settings (see FIG. 7, left column), in particular on images taken under low light conditions. These artifacts are removed if the original tone curve is replaced by the approximated noise-optimal curve (see FIG. 7, middle column). As a result, regardless of the tone mapping parameters set by the user, the modified algorithms produce tone mapped images in which the visible noise is drastically reduced. These modifications enable a more robust application of existing tone mapping operators. As we show, for an interactive application, the tone mapping strategy and the parameters do not need to be manually adjusted for every type of scene or camera in order to reduce the effect of the noise in the results. Additionally, the user can change the balance between noise visibility and use of target contrast range by adjusting $z_\alpha$.

With the increased availability and capabilities of digital cameras, more high dynamic range content is generated every day, including content acquired in low light conditions. We have seen how existing tone mapping operators do not perform reliably in low light, where camera noise is more pronounced. Based on the availability of camera noise models and contrast perception models, we provide two metrics, contrast waste and contrast loss, that measure the efficiency of existing tone mapping operators in allocating the available display contrast. We further applied these models to propose a principled way to improve their robustness in low light conditions. We showed that the robustness of existing tone mapping operators was improved by including these models in the tone mapping process. Therefore, our method enables users to obtain feedback about the expected quality of existing tone mappers, and to apply them reliably in automatic settings, even for images in low light conditions. Lastly, we believe the proposed metrics can be applied beyond the tone mapping context, and generalize well to evaluate other image processing operations in different domains.

Robust and Content Aware High Dynamic Range Imaging

Figure 8:
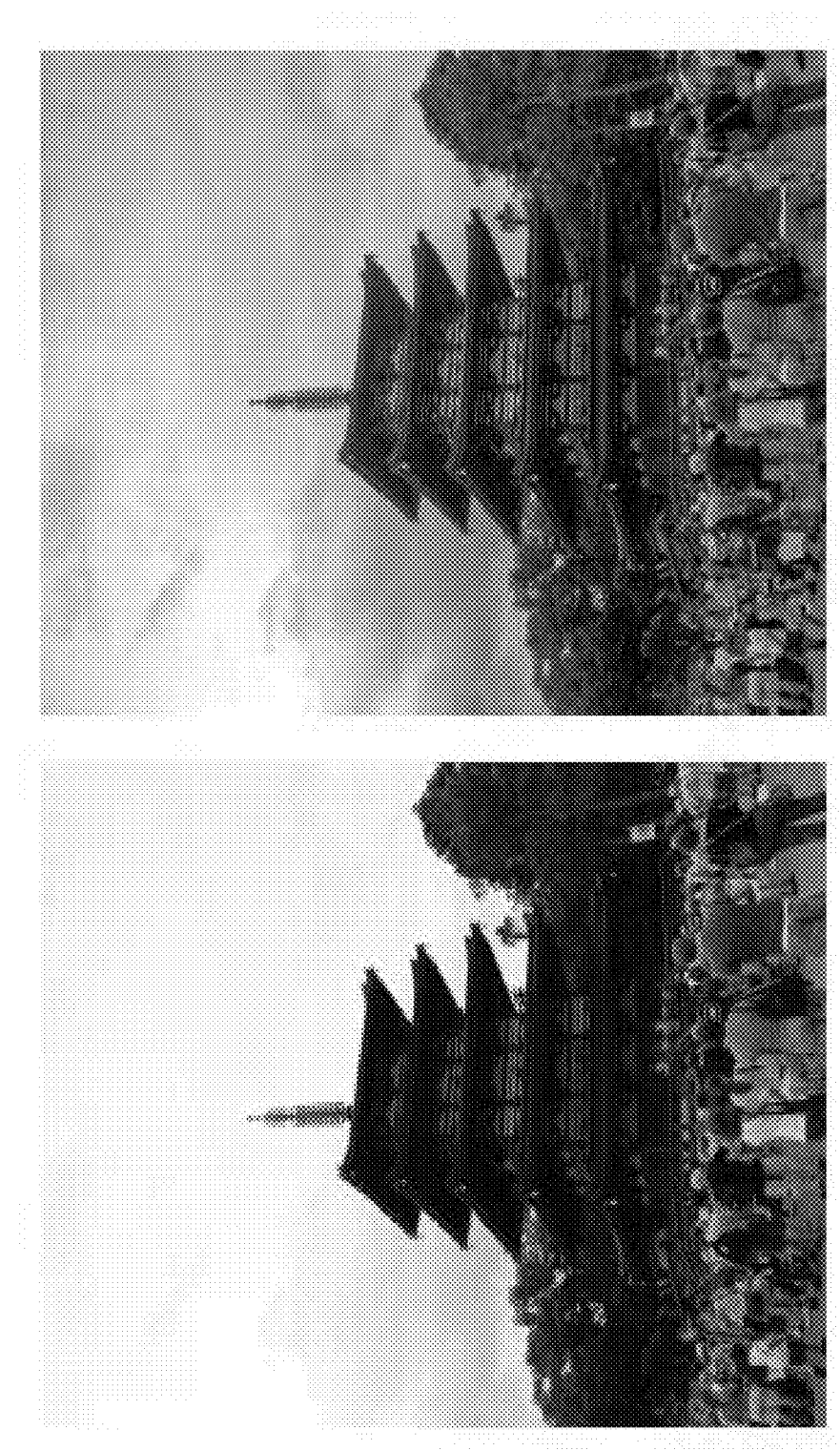
FIG. 8 is an example of image enhancement through robust HDR reconstruction.
Figure 10:
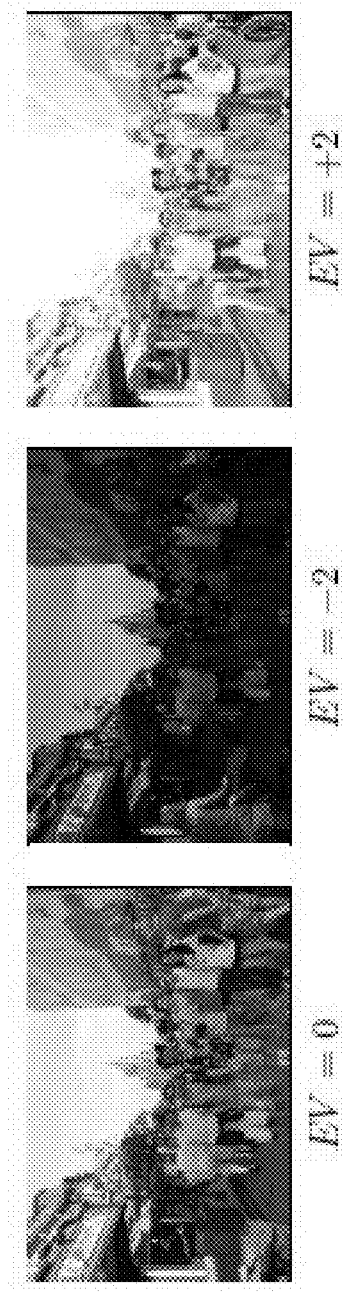
FIG. 10 is a sample of a hand-held exposure sequence.
Figure 16:
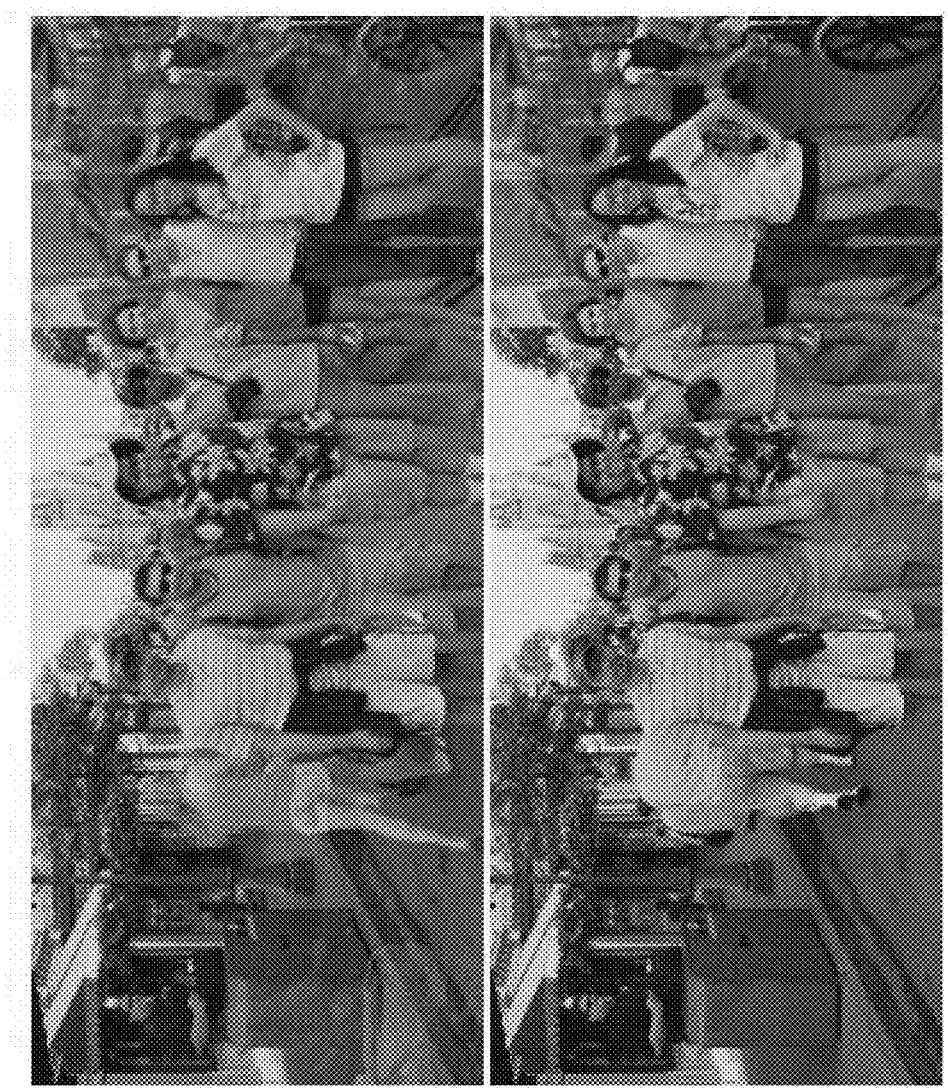
FIG. 16 is an illustration of ghosting artifacts when reconstructing HDR images of dynamic scenes.

High quality photographs can be obtained by exploiting the capabilities of high dynamic range (HDR) imaging. These images are better exposed at bright and dark image regions and match better the response of the human visual system (see FIG. 8, for an example, with the leftmost image being the standard photograph, and the rightmost being the enhanced image). In general, HDR images can be captured using (currently expensive) special cameras, but they can also be reconstructed from several photographs that sample different light ranges of the scene. These photographs are often captured at different exposure time and/or ISO sensitivity settings in a fast succession such that there is almost no motion in the scene between photographs (see FIG. 10). This sequence was acquired using automatic exposure bracketing (nine images at 0.3 stops). Only three images are shown. For creating an HDR image, the input images are aligned and brought to a common scale (i.e. differences in exposure time and ISO are compensated). Then, these images can be combined (averaged) into a single HDR image. However, when the scene is highly dynamic (e.g. when there are several people walking in the parks or where the camera is not fixed by a mounting or a tripod), the resulting content in each image will be too different, thus creating so called ghosting artifacts (see FIG. 16, where the top image includes ghosting artifacts and the ghosts have been removed from the bottom image).

Below, details are provided for a pipeline to create HDR images, starting with the geometric alignment and special handling of different types of input photographs (i.e. RAW and JPEG) and a description of how the HDR images are created.

The pipeline is very robust and can handle real world images taken with handheld cameras, either JPEG or RAW format, with arbitrary settings (variable ISO, aperture priority or exposure priority), and produce high-quality images using HDR reconstruction followed by tone mapping (JPEG and RAW images) or by direct image fusion of the JPEG images.

Pipeline

Figure 9:
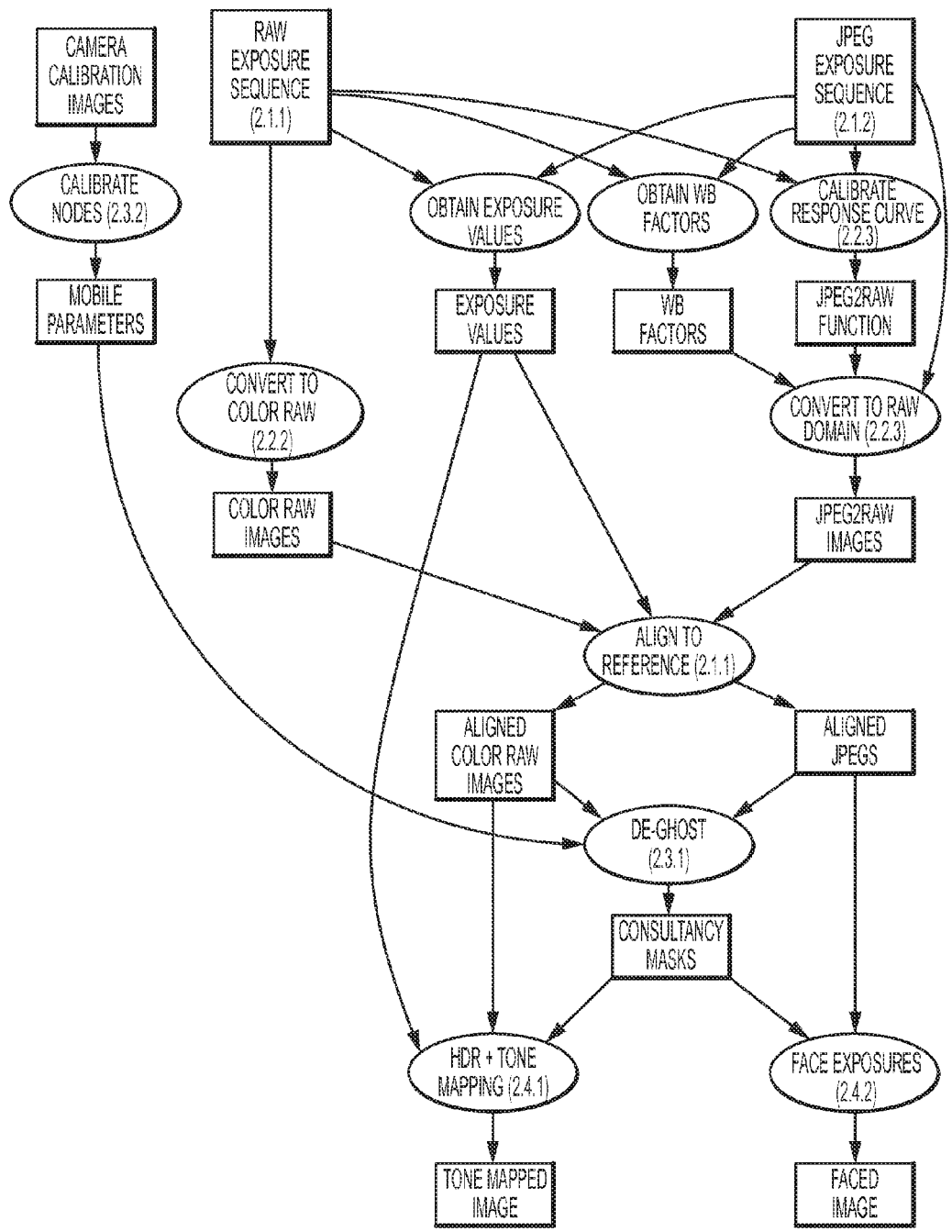
FIG. 9 is a flowchart of a pipeline for HDR reconstruction from exposure sequences.

The proposed pipeline for producing HDR images from exposure sequences is shown in FIG. 9. The pipeline takes RAW images and/or JPEG images (or other types of images) and a set of images for camera calibration, and outputs a set of tone mapped HDR images and/or an image fusion result. The main intermediate steps described in this report are geometric alignment, filtering of RAW input and JPEG input, de-ghosting, and HDR reconstruction and image fusion.

High dynamic range images can be reconstructed from sequences of images exposed to capture different irradiance ranges of the scene, i.e. from images taken at different exposure time or ISO sensitivity settings. As HDR images are reconstructed from the average of the image sequence, it is important that the scene is projected in the image sensor in the same way in every image. This is achieved by keeping the aperture of the camera constant in all exposures. For most scenes, an HDR image can be reconstructed from just three images taken at ±2EV or ±3EV stops, but larger exposure differences might be necessary depending of the dynamic range of the scene. The central exposure (EV=0) is automatically estimated in the camera depending on the given user-settings (e.g. for minimizing the amount of under-, over-exposed pixels in a particular image region or on the whole image). For discussion purposes, the images are assumed to be taken with a hand-held digital camera (see FIG. 10, for an example).

The input images could have been saved either in uncompressed (or RAW) or compressed (e.g. JPEG) format. The differences between these two representations are described next.

RAW images contain the digital intensities measured by the camera, without any processing. Given the physics of the light measurement process in CCD/CMOS chips, these values are linearly proportional to the irradiance arriving into to the sensor. They can more generically be referred to as linear color space images. There are other image formats that are also linear color space images.

JPEG images produced by the camera undergo additional transformations that include: white balancing, dynamic range compression, de-noising, color enhancement, edge enhancement, and storage compression. These transformations are not linear, and therefore, the intensities on the resulting images are not proportional to the irradiance arriving in the sensor. Thus, these are non-linear color space images (and there are other types of non-linear color space images). A later discussion gives details on how this process can be inverted.

Before the HDR image is estimated, the input images need to be aligned (if acquired with a hand-held camera). Next, depending on the image representation output by the camera, the images need to be either de-noised (for linear RAW input) or converted to a linear space where pixel intensities are represented in the same scale (for JPEG input). These three steps are described next.

Figure 11:
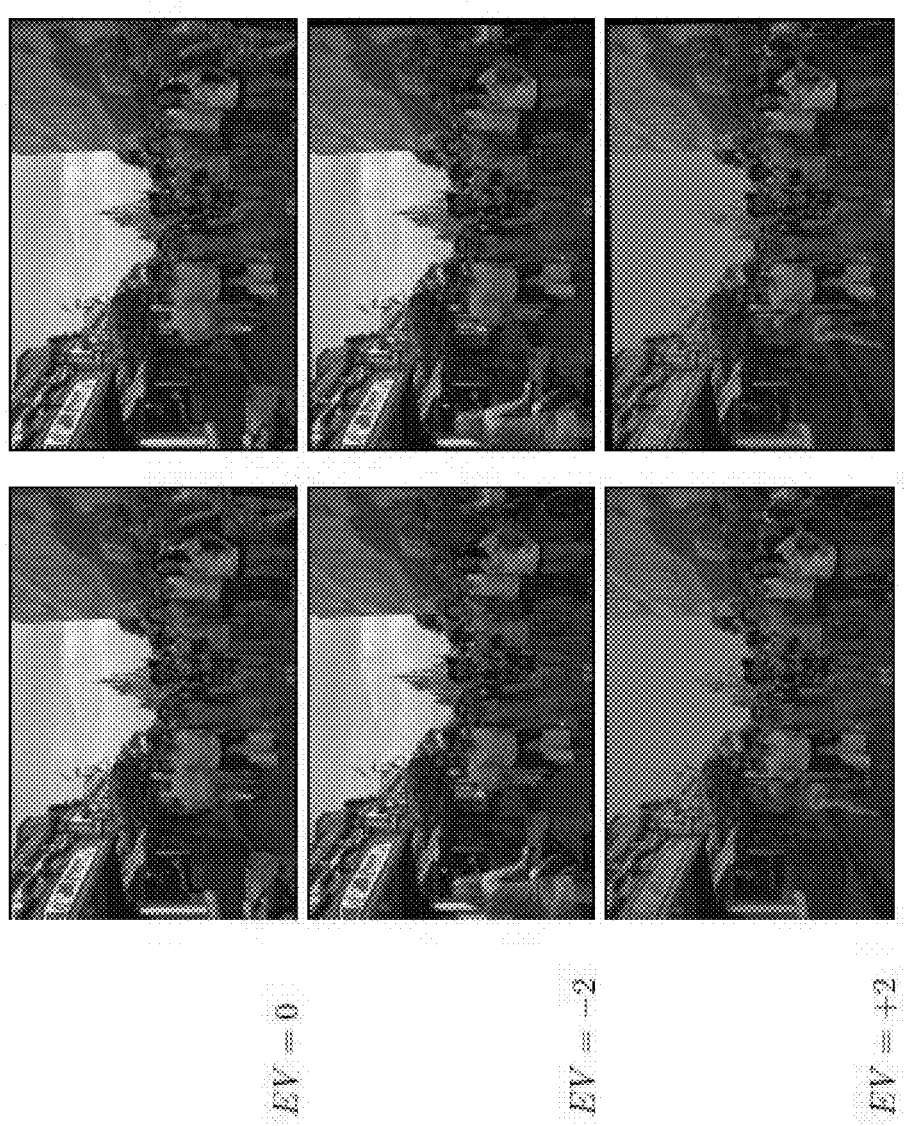
FIG. 11 is an illustration of geometric alignment of the exposure sequence.

For aligning hand-held exposure sequences, it is assumed that the camera motion is small enough so that the differences in the projections between images can be approximated using a single homography. The homographies are computed between central exposure and every other exposure, using feature matching for establishing spare correspondences and RANSAC to estimate the homography. Before feature matching is performed, the intensities of the non-central exposures are transformed to match the intensity of the central exposure, i.e. by multiplying the image by $2^{EV_i}$; (see FIG. 11, for an example, which shows on the left input images after EV compensation and on the right input images after geometric alignment using homographies). The non-public implementation of [GKT+12], which is based in public algorithms and implemented using the OpenCV library, is used for performing the alignment.

Figure 12:
FIG. 12 is an illustration of noise-aware image de-noising.

De-noising: The raw camera output does not undergo any transformations, so camera noise can be still visible in the image. For this reason, the input needs to be de-noised during the HDR reconstruction pipeline. This de-noising process should try to smooth out regions that suffer from noise without removing any of the image signal. In order to achieve this, the image strength of the smoothing should be adjusted to every image. For this step, the noise-prediction model and the de-noising step described in are used, where bilateral filtering is applied with a variable range kernel that depends of the predicted noise at every pixel. See FIG. 12, for an example, which shows on the top the original raw image and on the bottom the de-noised image.

Figure 13:
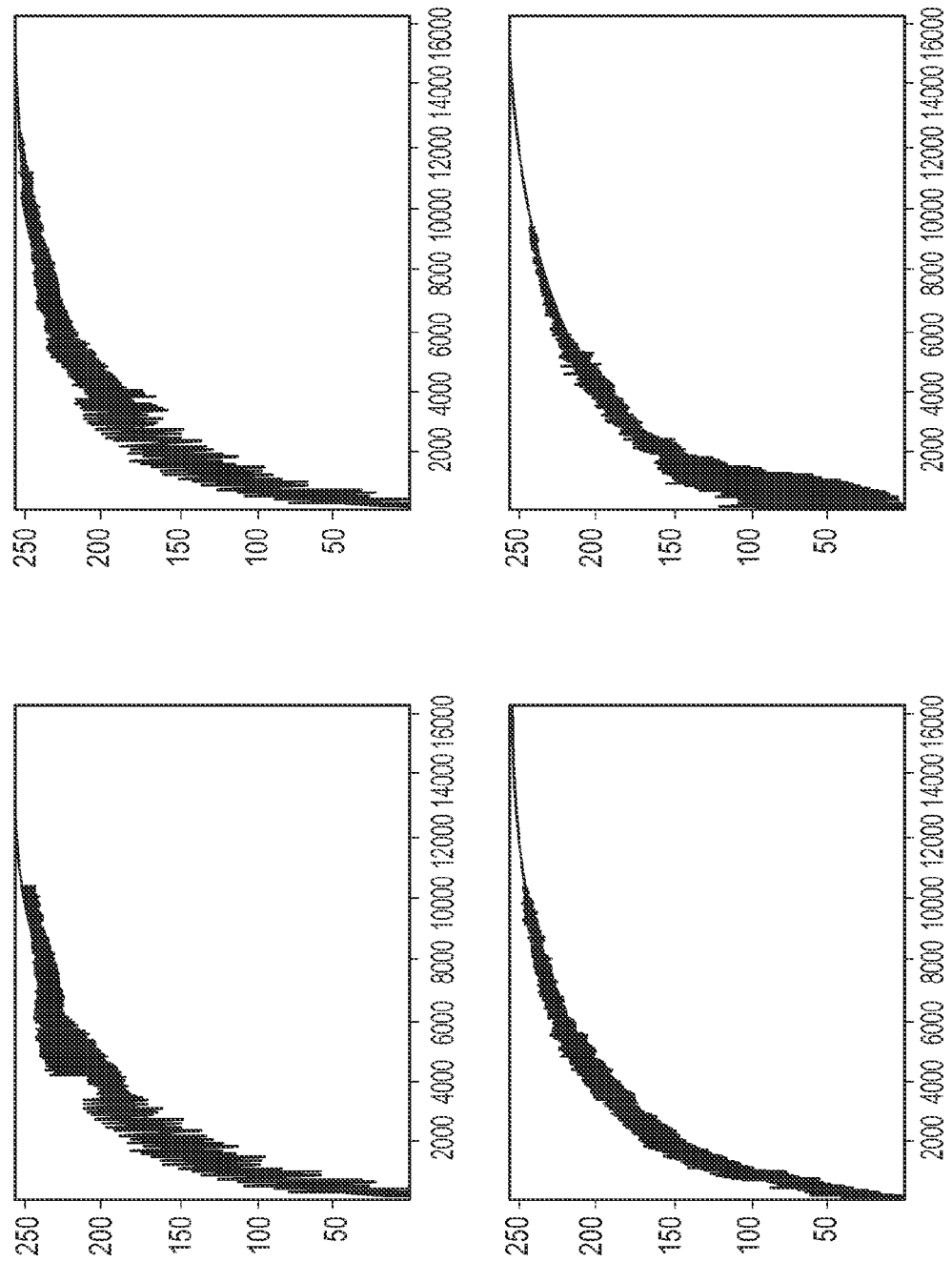
FIG. 13 is an illustration of function mapping RAW intensity values to JPEG intensity values.

JPEG to RAW conversion: When the input includes JPEG images (or any other type of non-linear color space image), we first transform them to match the intensity distribution of the RAW images produced by the camera (or any other type of linear color space image). This is done in order to make HDR reconstruction easier, by taking advantage of the linearity of RAW images, and the possibility of predicting their noise distribution. We perform this transformation by applying the inverse of the camera response curve, which maps RAW values to JPG values. For recovering the response function, for each camera model, we take a set of RAW-JPEG image pairs, compensate for white-balancing factors reported by the camera, and estimate the function that maps RAW intensities to JPEG intensities. The final response curve is obtained by averaging the curves resulting from several pairs. An example of the response functions estimated from RAW-JPEG image pairs is shown in FIG. 13, which shows higher RAW values being compressed more than lower ones. The mapping for four different photographs is shown here. However, this camera response curve does not account for image-enhancement operations that could occur in-camera, such as saturation enhancement. This fact makes the process of JPEG to RAW conversion less accurate, but it could be improved in the future by accounting for gamut transformations that occur during the in-camera processing.

Figure 14:
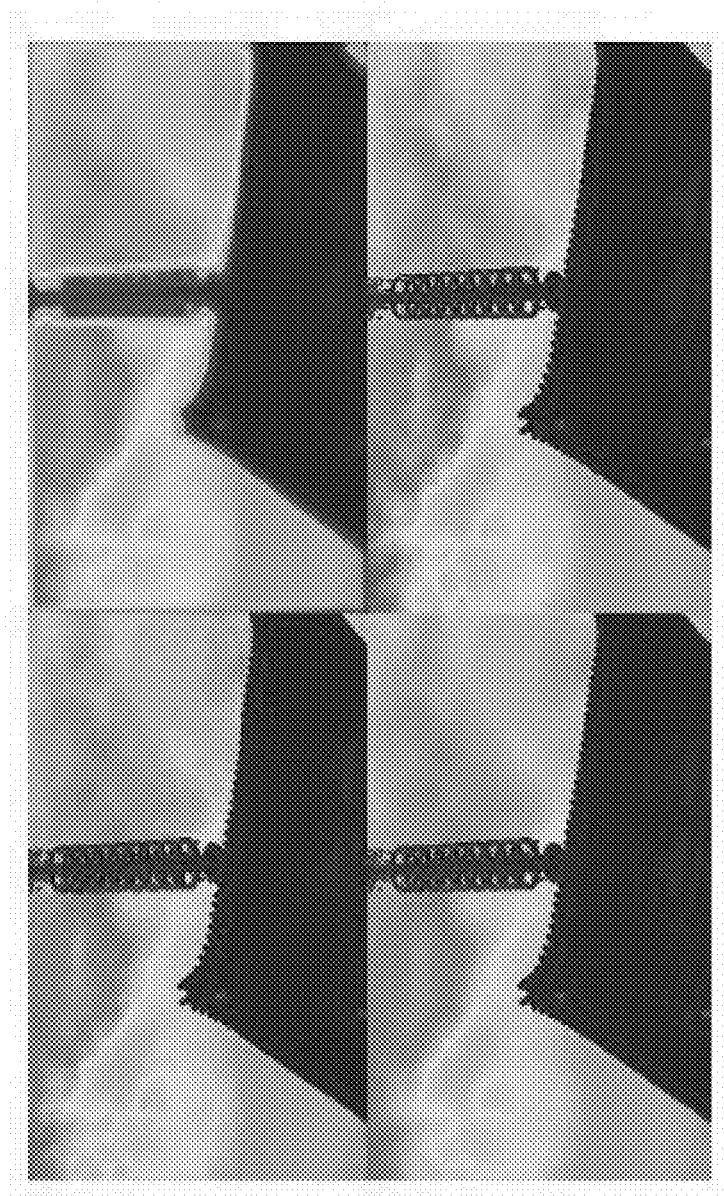
FIG. 14 is an illustration of image de-noising.
Figure 15:
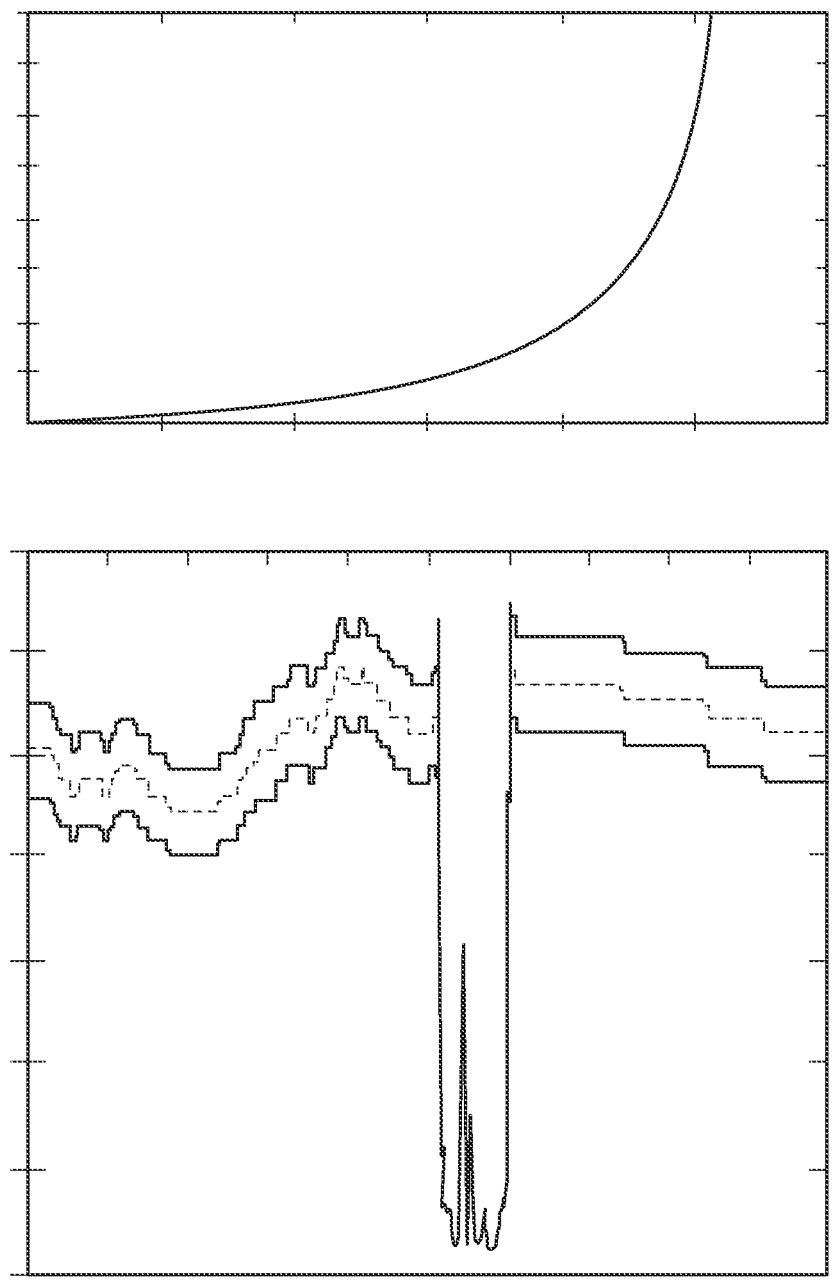
FIG. 15 is an illustration of banding artifact removal in JPEG to RAW conversion.

Banding artifact removal: During the generation of JPEG images, the intensity values measured by the camera are remapped according to the camera response function. This function maps raw intensities (e.g. $(0-2^{14})$, for a 14-bit camera to JPEG intensities (e.g., $(0-2^8)$). As shown in FIG. 13, this function has the effect of expanding darker raw values into a comparatively larger JPEG range, and compressing brighter raw intensity values into a few JPEG values. Since brighter raw intensities are represented using fewer values in the JPEG image, banding artifacts will appear in the image when transformed to the raw domain (see the sky in FIG. 14, top-left). The top left shows the original JPEG image, the red channel being color coded, Gaussian smoothing is shown in the top right, quantization-adaptive bilateral filtering is shown in the bottom left, and the ground truth RAW image is shown in the bottom right. Simple spatial smoothing can reduce the effect of banding artifacts but will also blur image edges (see FIG. 14, top-right). For solving this problem, we apply bilateral filtering for reducing these quantization artifacts while at the same time keeping the image edges (see FIG. 14, bottom-left). Since we know the size of the quantization bins in the RAW to JPEG conversion from the derivative of the inverse camera response (see FIG. 15, top, which shows the range bandwidth per JPEG intensity value, where brighter intensities receive larger filtering kernel in order to compensate for the larger quantization error), we can adjust the range bandwidth of the bilateral filtering according to the bin size (see FIG. 15, bottom, which shows a scanline of the row from FIG. 14, where red shows the JPEG-to-RAW intensity, and yellow represents the range of intensities to be used during bilateral filtering). In this way, a larger kernel is applied to regions where banding artifacts appear. Still, the fine structures in bright regions of the original image (e.g. the clouds in FIG. 14) are lost during the RAW-to-JPEG conversion and only a smoothed version can be recovered.

It should be understood that while RAW images and JEPG images are specifically discussed throughout this disclosure, the disclosure is not limited to the two types of images. Instead, any type of linear color space image format could be substituted for the RAW image format and any type of non-linear color space image format could be substituted for the JPEG image format The most common strategy for obtaining images with extended dynamic range is to merge (average) several images with different exposure times. This method assumes that the objects in the scene are static, in a way that the only difference between the images is the amount of light arriving from the scene to the camera. However, since in general scenes can be dynamic, ghosting artifacts can appear when merging images of moving objects (see FIG. 16, for an example). If it is known that the multiple images were captured with a camera mounted on a tripod or other stable object and/or that there were no moving objects in the scene that was imaged, this de-ghosting operation may not be necessary. The main strategy for dealing with this problem is to average only those image regions that correspond to the same object. This problem is described next.

Figure 17:
FIG. 17 is an illustration of consistency region selection.

The de-ghosting part of the pipeline involves selecting the mutually-consistent parts in the input images. These consistent parts are represented as a mask that indicates whether a pixel in one image is to be included in the HDR reconstruction or not. For instance, if the color of a (static) object is shown at the same pixel location (after alignment) in every image, the corresponding set of colors is considered consistent; in this case the consistency bit will be set to 'true' at that pixel in every image. On the other hand, if different (dynamic) objects are shown in every image, the corresponding set of pixels is considered inconsistent; in this case, the consistency bit will be set to 'true' in only one of the images. Naturally, if a pixel color is consistent in two or more (but not all) images, the consistency bits are set accordingly. FIG. 17 shows an example of the consistency masks. The method for selecting consistent regions used in our pipeline was developed by Granados and colleagues [Granados et al. 2013]. The top row shows the input images, while the bottom row shows consistency masks. Here, green connotes consistency in red inconsistency. Note that the dynamic content in the foreground is selected mostly from the first image, whereas static content such as the sky is selected from the first and second, since in the third image the sky is overexposed.

The process of selecting consistent regions requires calibrating the gain, readout noise, black level, and saturation level of the imaging sensor. This can be done by acquiring a set of calibration images, and needs to be performed only once for each camera model. The calibration process used in our pipeline was developed by Granados and colleagues [Granados et al. 2010].

For achieving a more robust calibration and handling vendor-specific behaviors, we extended the calibration process to handle dependencies between the ISO setting and the readout noise level and saturation level of the camera. These extensions are described below. In addition, in order to make the pipeline more flexible, we added support for handling exposure sequences with variable ISO and aperture. This was done by extending the noise model presented in [Granados et al. 2010] to account for the ISO-dependent gain factor and the effect of the amount of light arriving to the camera sensor caused by aperture differences.

Once the images are aligned, filtered (in the case of RAW input), and the consistent parts across images are detected, an image with extended dynamic range can be created. Two methods are available for producing images with higher dynamic range: HDR reconstruction followed by tone mapping (RAW and JPEG input), and exposure fusion (JPEG input).

In HDR reconstruction, the input images are first transformed to a common scale by applying the inverse of the camera response, and compensating by the differences in exposure time, ISO sensitivity, and aperture. Once the intensities are represented in a common scale, the consistent color values on each of the images are averaged. Note that under- and over-exposed values need to be excluded from the average, as such values are no longer proportional to the light in the scene. We apply the reconstruction method described in [Granados et al. 2010].

Figure 18:
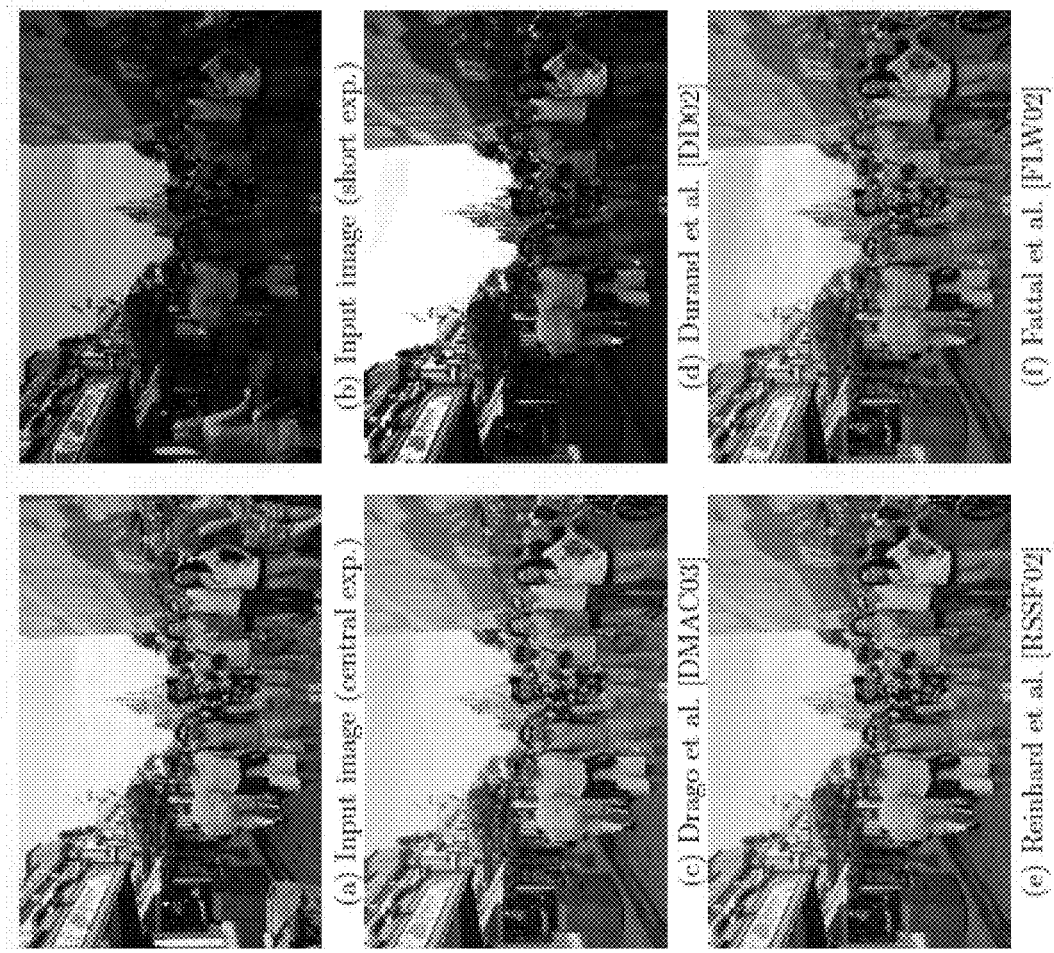
FIG. 18 is an illustration of several tone-mapping methods applied to the same reconstructed HDR image.
Figure 19:
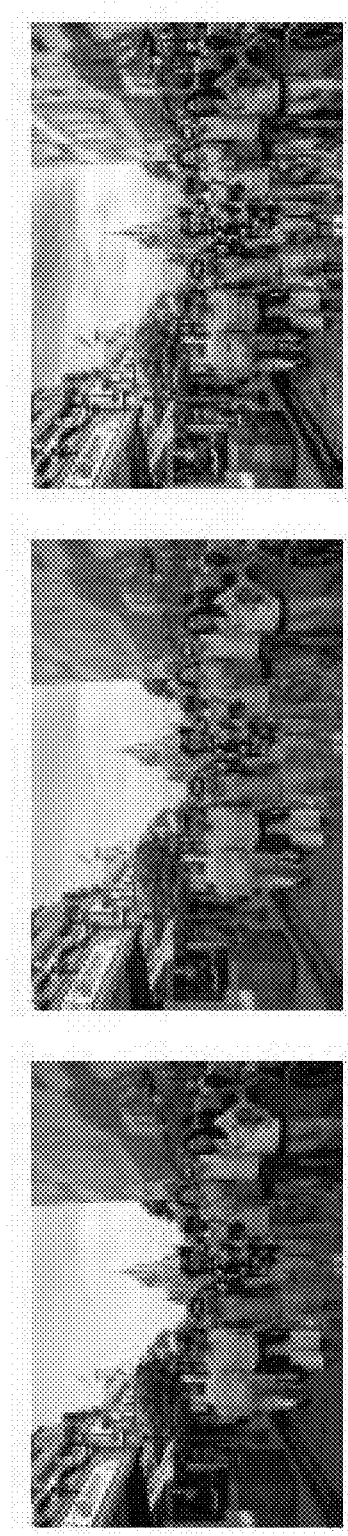
FIG. 19 is an illustration of images obtained with the Fattal et al. tone mapping operator using different parameters.

The resulting HDR image contains values that are proportional to the irradiance in the scene. However, such an image cannot be reproduced in common visualization media (e.g. screen, prints) so it has to be converted to a low dynamic-range (LDR) image beforehand. This conversion process is known as tone mapping. In general, tone mapped HDR images will show more details of the scene (e.g. in very bright and very dark regions) than a single LDR image captured with the camera. FIG. 18 shows several examples of tone mapping operators (TMO) applied to the same reconstructed HDR image, and FIG. 19 shows examples of images obtained using one of the TMOs, but with different operational parameters. In this case, from left to right, the parameter $\beta$, which controls the amount of local contrast, was set at 1.0, 0.95, and 0.8.

For making the tone mapping process robust to different inputs, we select different tone mapping parameters depending of the input source. In particular, we instruct the tone mapping algorithms to produce more saturated colors when the input is RAW data. On the other hand, since JPEG images already contain some saturation-enhancement process, we instruct the TMO to not increase the saturation of the input images.

Additionally, when the input includes RAW images, we add an additional sharpening step to the final tone mapped image. Such contrast-enhancement operations are usually performed in-camera for JPEG inputs, so they are only required for RAW input.

Figure 20:
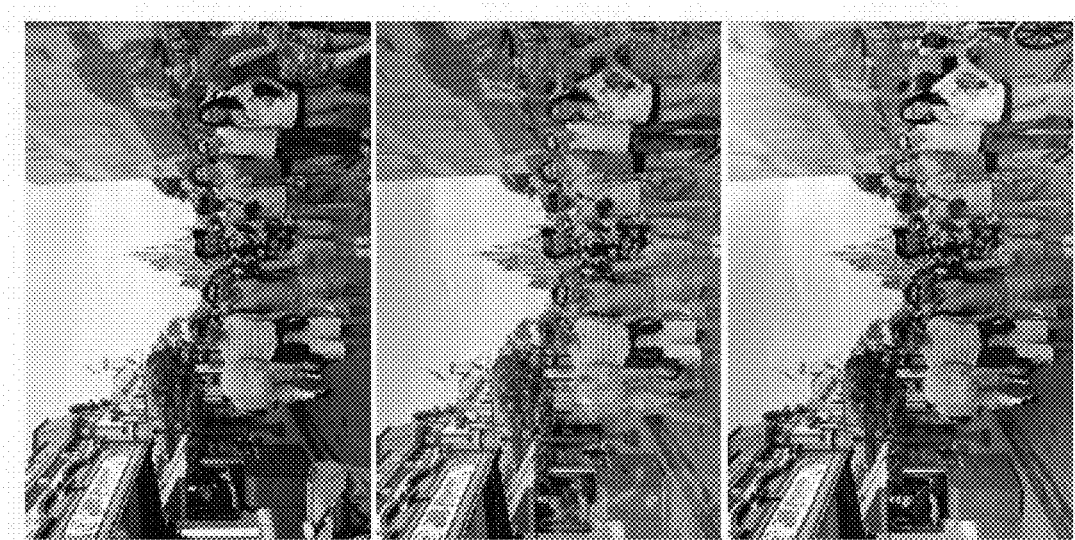
FIG. 20 is an illustration of exposure fusion.

Exposure fusion is an alternative to HDR reconstruction followed by tone mapping. It performs a weighted average of the JPEG images directly, where the weights are selected according to criteria such as well-exposure, color-saturation, and contrast. However, if the scene contains motion, exposure will also create ghosting artifacts (see FIG. 20, top). The top image shows the central exposure, the middle image shows exposure fusion without region consistency, and the bottom image shows exposure fusion with consistency detection. We adapted the exposure fusion algorithm to take into account the consistency masks (see FIG. 17). In this way, ghosting artifacts are avoided by excluding such inconsistent regions from the average (see FIG. 20, bottom).

The main outcome of this work was the development of a very robust, flexible pipeline for HDR reconstruction that can handle most scenarios that arise in real world: Camera shake, variable camera settings, vendor-specific camera behaviors, and different type of inputs (RAW and JPEG). In particular, we completed a pipeline that can take JPEG images as input that can still use noise-prediction models to perform HDR reconstruction without requiring RAW data. Additionally, the output of the pipeline could be either an HDR image, a tone mapped HDR image, or an image fusion result. The new components that allowed robust HDR reconstruction are described next.

Calibration of Saturation Value Per ISO Setting

This covers the process of calibrating the camera saturation level per each ISO value. This could be done for some camera models/vendors since the camera behavior might change for different ISO values. This calibration allows a more robust HDR reconstruction in sequences taken with variable ISO.

JPEG-to-RAW Conversion

This covers the process of calibration and conversion of JPEG images to the scale of the camera's RAW image, such that a noise-magnitude prediction can be applied. Future extensions could include adding the intensity-dependent quantization noise to the noise model in order to improve its prediction accuracy JPEG-to-RAW Banding Artifact Suppression This covers the process of filtering banding artifacts in JPEG-to-RAW images that arise due to the (heavy) quantization that JPEG images undergo during in-camera processing.

Constrained Exposure Fusion

This covers the consistency-constrained exposure fusion algorithm which, in addition to the input exposures, takes into account a consistency masks that determines the image regions to be fused from each input.

Input-Dependent Tone Mapping

This covers the selection of different tone mapping parameters and post-processing steps according to the type of image input received by the algorithm (i.e. RAW or JPEG). In particular, since JPEG images already contain image-enhancement operations such as saturation and contrast enhancement, these operators are not re-applied for JPEG input during the tone mapping process in order to avoid including artifacts due to double application of the operators.

Noise-Aware Gradient Domain Tone Mapping

Figure 21:
FIG. 21 is an illustration of an improvement that could be made to the tone mapping algorithm of Fattal et al. if an image-noise model is taken into account.

This covers the idea of modifying a (or creating a new) tone mapper in order to account for the noise predicted for a reconstructed HDR image. The objective is to avoid that noise from being amplified in the final tone mapped image. This consideration is especially important for gradient-enhancing tone mappers, where any gradients caused by noise should not be amplified. In particular, we experimented with the method of Fattal et al. (see FIG. 21). The left image shows a single input image, the middle image shows attenuated gradient magnitudes computed by the Fattal et al. TMO, and the right image shows the result by the Fattal et al. TMO after reconstructing the image using the attenuated gradients (Poisson reconstruction). The darker regions are enhanced but so is the readout noise in the sky region. This illustrates an opportunity to improve the tone mapping operator using a camera noise model. The idea for extending this method is to reduce the gradient scaling factors $\phi_k(x,y)$ whenever any given gradient magnitude can be explained by noise. The current proposal for a gradient reduction function is shown in FIG. 22. The original function is shown in the left graph, while the right graph shows a proposed noise-aware attenuation function. In the plots, the x-axis represents the image intensity and the y-axis the gradient attenuation factor. The blue curve is the attenuation curve. The green vertical line corresponds to the point where the factor is less than one (i.e. it is attenuated, this is a user given parameter). The red line corresponds to gradient intensities that could be caused by noise. Note how in the original version, the gradients that could be caused by noise are given a large weight, whereas in the proposed version these gradients are left untouched.

Low-Light Multi-Exposure Merging

This covers the process of merging multiple exposures in order to improve the quality of night shots. This can be achieved in a similar fashion to regular HDR images. However, in this scenario the challenges of handling motion in the scene are exacerbated. First, low light requires longer exposures in order to properly capture poorly lit objects, but dynamic objects will suffer from motion blur artifacts. Second, if shorter exposures are taken as to avoid blurry artifacts, the sensor might not collect enough light resulting in an image dominated by readout noise.

Figure 23:
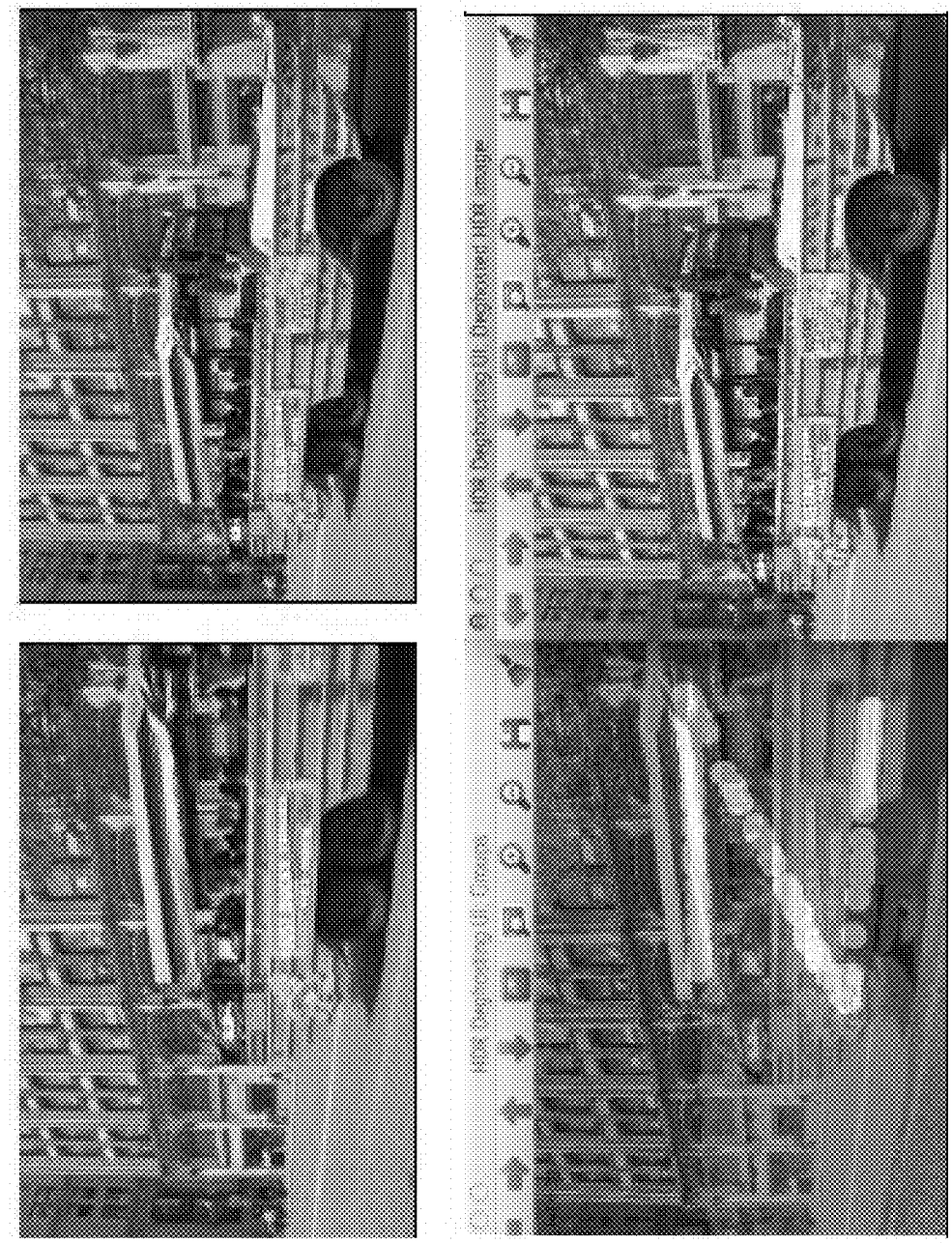
FIG. 23 is an illustration of interactive motion blur suppression.

Solving this problem required developing an algorithm that can take into consideration camera noise and motion blur for deciding which images to use for reconstructing the final HDR image. Since automatic blur detection software is not well developed, we employed user-given stokes that indicate which blurry regions should not be used in the final HDR reconstruction. If we assume that all blurry regions are marked, a noise-optimal HDR image can be reconstructed by taking the longest non-blurry, non-saturated image whenever possible. This strategy is illustrated in FIG. 23, albeit not in a night scene. The top left image is an example of an automatic HDR result where a blurry instance of the truck was selected from the longest exposure. The top right image shows result after constraining the optimization to not include the blurry instance. The bottom shows a screenshot of the interface where the user can mark image regions that should not be shown in the final HDR image. In this case the user marks part of the blurry instance of the truck using a Z-shaped stroke. Using this information, the blurry regions are avoided by the HDR reconstruction algorithm, and a non-blurry HDR linage can be reconstructed.

Skin-Tone-Preserving Tone Mapping

Figure 24:
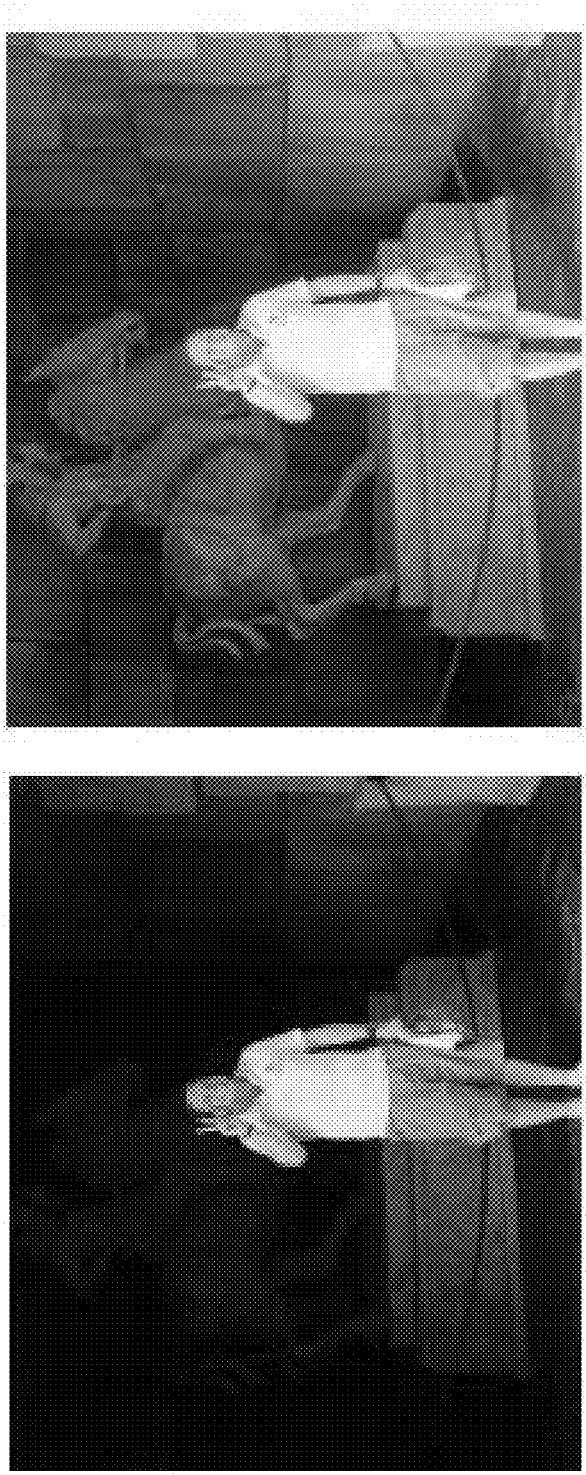
FIG. 24 is an illustration of skin-color distortion in tone mapped images.

This covers the idea of preventing the human skin color to be altered while tone mapping an HDR image. This could be done by using a face detector to detect the location of people, and training a color model to find other skin regions in the image. An example of the type of HDR images that could be improved using this method is shown in FIG. 24. Left image is the original JPEG image, while the right image is a tone mapped HDR image with skin color was distorted. Often, the amount of color distortion (e.g., saturation enhancement) applied by tone mappers can be controlled by the user. However, the selection of such parameters might not generalize well across cameras and scenes, making it necessary to include this skin-color constraint to the tone mapping process.

The concept can be further generalized to content-aware tone mapping, which considers semantic information contained in the image and adapts the tone mapping accordingly. For instance by detecting an object in the image, whose appearance is known from reference imagery, the tone mapping could be adapted to ensure the desired look is achieved. Additionally, other image elements such as the sky, clouds, and tree could also be detected and used to adapt the tone mapper to produce a creatively directed look.

Fake-Real Tone Mapping

This focuses on creating tone mappers aimed to address needs to create images with the aesthetics typical of fantastic story telling that retain an element of realism. These tone mappers would allow the creation of images that maintain the natural appearance of the guest while increasing the contrast in the background to create a dramatical and fantastical photo that combines realistic and creative elements.

Content-Aware Exposure Fusion

Content-aware exposure fusion considers the semantic information contained in the image and adapts the fusion accordingly. This is similarly important for natural looking skin tone.

HDR Imaging for Fast-Moving Targets

Developing HDR imaging techniques for fast moving targets would allow such techniques to be used in ride vehicles. This could be accomplished by taking multiple exposures separated by long time intervals. The first exposure would be taken before the ride vehicle arrives to the photo spot, the next would be taken to capture the guests in the vehicle, and the final after the vehicle has left the photo spot.

Increasing the Dynamic Range of Regular Photographs

This focuses on developing techniques to increase the dynamic range of regular photographs by combining them with HDR reference images of the same location.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

At this point, methods and techniques for performing such computer-implemented methods will be discussed. Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 810.

In at least one embodiment, CPU 102 may be caused to perform one or more of the different types of functions and/or operations under the control of software modules or components, which for example, may include an operating system and any appropriate applications software, drivers, and the like. CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 810 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the embodiments described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
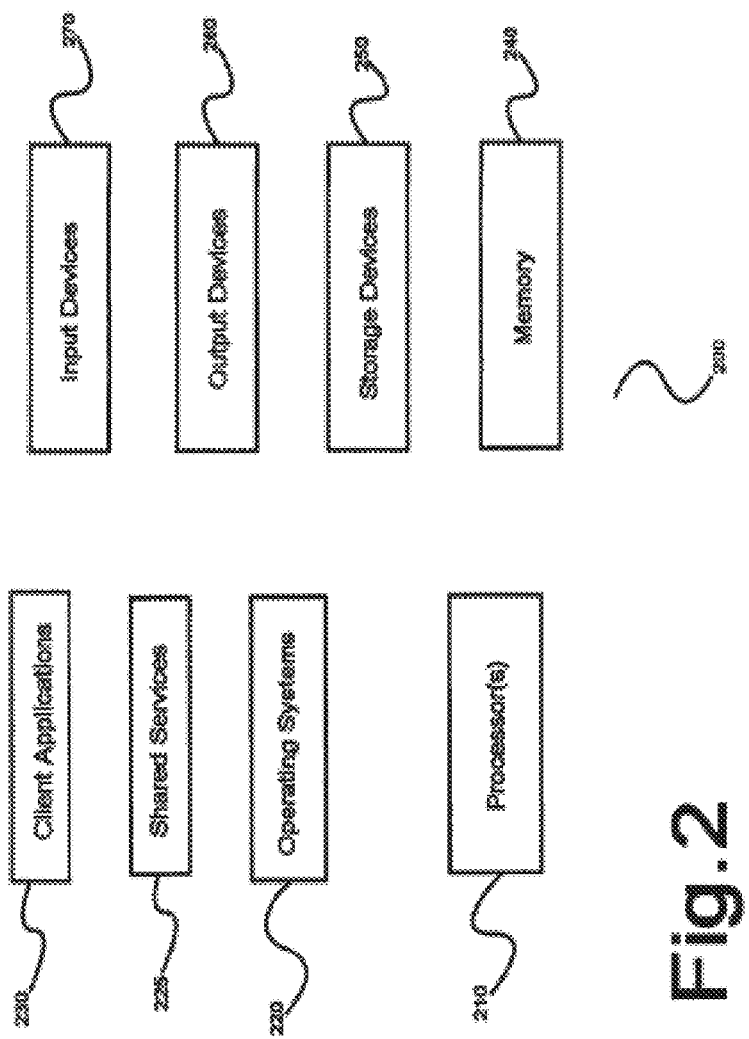
FIG. 2 is a block diagram illustrating an exemplary logical architecture for a client device, according to an embodiment of the disclosure herein.

In some embodiments, systems may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
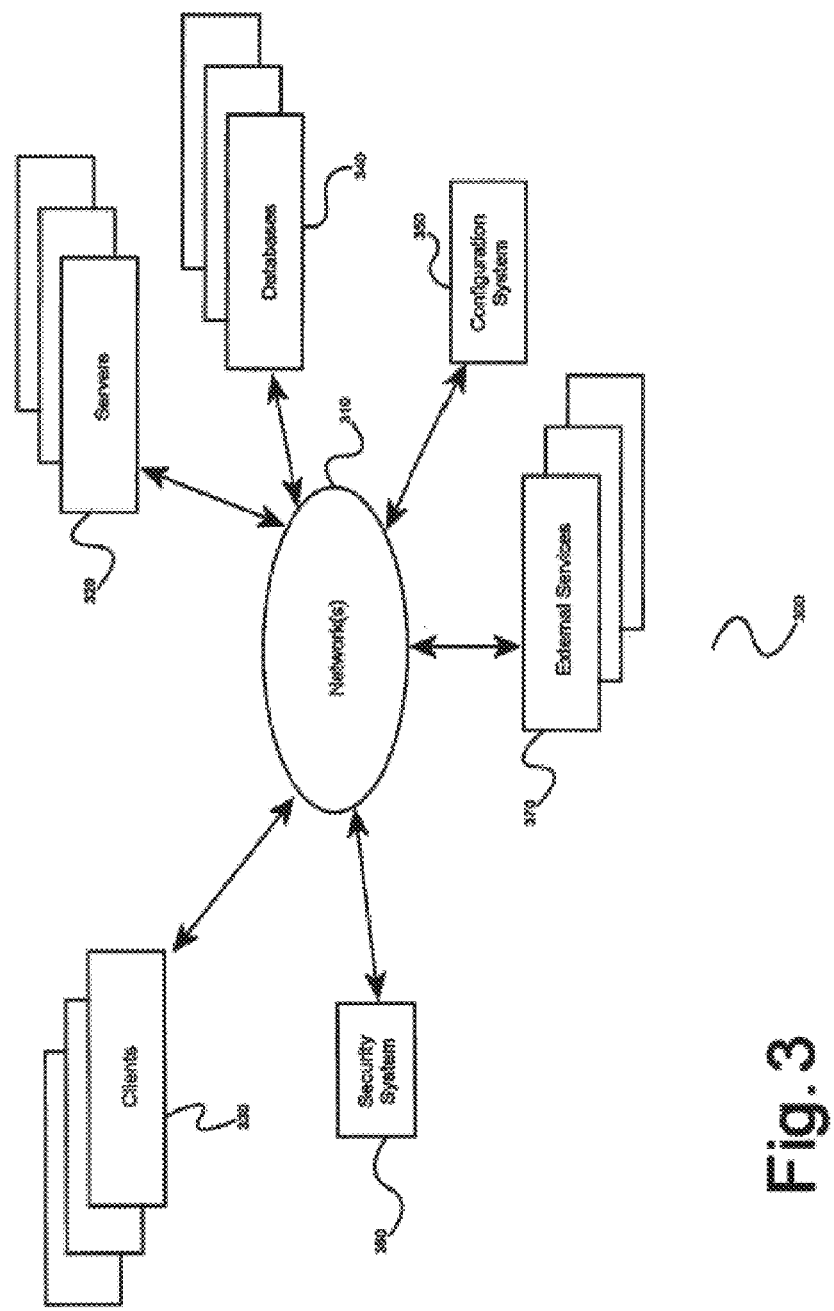
FIG. 3 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 3, there is shown a block diagram depicting an exemplary architecture for implementing at least a portion of a system according to an embodiment on a distributed computing network. According to the embodiment, any number of clients 330 may be provided. Each client 330 may run software for implementing client-side portions of the embodiments and clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments, clients 330 or servers 320 (or both) may make use of one or more specialized services or appliances that may be deployed locally or remotely across one or more networks 310. For example, one or more databases 340 may be used or referred to by one or more embodiments. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 360 or configuration system 350 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

The following publications are each incorporated herein by reference, in their entirety:

AYDIN, T. O., MANTIUK, R., MYSZKOWSKI, K., AND SEIDEL, H.-P. 2008. Dynamic range independent image quality assessment. ACM Trans. Graph. 27, 3 (August), 69:1-69:10.

DALY, S. 1993. Digital images and human vision. In Digital Images and Human Vision, A. B. Watson, Ed. MIT Press, Cambridge, Mass., USA, ch. The Visible Differences Predictor: An Algorithm for the Assessment of Image Fidelity, 179-206.

DURAND, F., AND DORSEY, J. 2002. Fast bilateral filtering for the display of high-dynamic-range images. ACM Trans. Graph. 21, 3 (July), 257-266.

FATTAL, R., LISCHINSKI, D., AND WERMAN, M. 2002. Gradient domain high dynamic range compression. ACM Trans. Graph. 21, 3 (July), 249-256.

FERWERDA, J. A., PATTANAIK, S. N., SHIRLEY, P., AND GREENBERG, D. P. 1996. A model of visual adaptation for realistic image synthesis. In Proceedings of SIGGRAPH 96, Annual Conference Series, 249-258.

GRANADOS, M., AJDIN, B., WAND, M., THEOBALT, C., SEIDEL, H.-P., AND LENSCH, H. P. A. 2010. Optimal HDR reconstruction with linear digital cameras. In Proc. Conf. on Computer Vision and Pattern Recognition, 215-222.

IRAWAN, P., FERWERDA, J. A., AND MARSCHNER, S. R. 2005. Perceptually based tone mapping of high dynamic range image streams. In Proc. of Eurographics Conf. on Rendering Techniques, 231-242.

JANESICK, J. 1985. CCD characterization using the photon transfer technique. In Proc. Solid State Imaging Arrays, K. Prettyjohns and E. Derenlak, Eds., vol. 570, SPIE, 7-19.

JANESICK, J. 2001. Scientific charge-coupled devices. SPIE Press.

KIRK, A. G., AND O'BRIEN, J. F. 2011. Perceptually based tone mapping for low-light conditions. ACM Trans. Graph. 30, 4 (July), 42:1-42:10.

LIU, C., SZELISKI, R., KANG, S. B., ZITNICK, C. L., AND FREEMAN, W. T. 2008. Automatic estimation and removal of noise from a single image. IEEE Trans. Pattern Anal. Mach. Intell. 30, 2, 299-314.

PATTANAIK, S. N., TUMBLIN, J., YEE, H., AND GREENBERG, D. P. 2000. Time-dependent visual adaptation for fast realistic image display. In Proceedings of SIGGRAPH '00, Annual Conference Series, 47-54.

REINHARD, E., AND DEVLIN, K. 2005. Dynamic range reduction inspired by photoreceptor physiology. IEEE Trans. Vis. Comput. Graph. 11, 1, 13-24.

REINHARD, E., STARK, M., SHIRLEY, P., AND FERWERDA, J. 2002. Photographic tone reproduction for digital images. ACM Trans. Graph. 21, 3 (July), 267-276.

REINHARD, E., WARD, G., PATTANAIK, S., DEBEVEC, P., HEIDRICH, W., AND MYSZKOWSKI, K. 2010. HDR Imaging—Acquisition, Display, and Image-Based Lighting, Second Edition. Morgan Kaufmann.

WANG, Z., BOVIK, A. C., SHEIKH, H. R., AND SIMONCELLI, E. P. 2004. Image quality assessment: from error visibility to structural similarity. IEEE Trans. Image Process. 13, 4, 600-612.

FREDO DURAND AND JULIE DORSEY. Fast bilateral filtering for the display of high-dynamic-range images. ACM Trans. Graph., 21(3):257-266, 2002.

FREDERIC DRAGO, KAROL MYSZKOWSKI, THOMAS ANNEN, AND NORISHIGE CHIBA. Adaptive logarithmic mapping for displaying high contrast scenes. Comput. Graph. Forum, 22(3):419-426, 2003.

RAANAN FATTAL, DANI LISCHINSKI, AND MICHAEL WERMAN. Gradient domain high dynamic range compression. ACM Trans. Graph., 21(3):249-256, 2002.

MIGUEL GRANADOS, BORIS AJDIN, MICHAEL WAND, CHRISTIAN THEOBALT, HANS-PETER SEIDEL, AND HENDRIK P. A. LENSCH. Optimal hdr reconstruction with linear digital cameras. In CVPR, pages 215-222. IEEE, 2010.

MIGUEL GRANADOS, KWANG IN KIM, JAMES TOMPKIN, JAN KAUTZ, AND CHRISTIAN THEOBALT. Background inpainting for videos with dynamic objects and a free-moving camera. In Andrew W. Fitzgibbon, Svetlana Lazebnik, Pietro Perona, Yoichi Sato, and Cordelia Schmid, editors, ECCV (1), volume 7572 of Lecture Notes in Computer Science, pages 682-695. Springer, 2012.

HAI TING LIN, SEON JOO KIM, SABINE SUSSTRUNK, AND MICHAEL S. BROWN. Revisiting radiometric calibration for color computer vision. In Dimitris N. Metaxas, Long Quan, Alberto Sanfeliu, and Luc J. Van Gool, editors, ICCV, pages 129-136. IEEE, 2011.

TOM MERTENS, JAN KAUTZ, AND FRANK VAN REETH. Exposure fusion: A simple and practical alternative to high dynamic range photography. Comput. Graph. Forum, 28(1):161-171, 2009.

ERIK REINHARD, MICHAEL M. STARK, PETER SHIRLEY, AND JAMES A. FERWERDA. Photographic tone reproduction for digital images. ACM Trans. Graph., 21(3):267-276, 2002.

GRANADOS M., KIM K., TOMPKIN J., AND THEOBALT C., Automatic Noise Modeling for Ghost-free HDR Reconstruction. ACM Transaction on Graphics (Proc. of SIGGRAPH Asia), 2013.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. A computer-implemented method for improving the quality of an image, comprising:
    receiving an input image;
    utilizing a tone mapping operator (TMO) having one or more operational parameters to tone map the input image and create a first tone-mapped image;
    generating a contrast waste score for the first tone-mapped image;
    generating a contrast loss score for the first tone-mapped image;
    with a computer, automatically utilizing the contrast waste score and the contrast loss score to tune one or more of the operational parameters of the TMO; and
    utilizing the TMO with the one or more tuned operational parameters to generate a second tone-mapped image from the input image.

2. A method as defined in claim 1, wherein the contrast waste score is representative of the amount of contrast in the first tone-mapped image that is used to represent noise.

3. A method as defined in claim 2, wherein the contrast waste score is generated by calculating a luminance difference between two adjacent pixels in the first tone-mapped image and multiplying that difference by the probability that the two adjacent pixels measure the same luminance.

4. A method as defined in claim 3, wherein the luminance difference is a normalized perceivable luminance difference.

5. A method as defined in claim 3, wherein the probability is determined from a noise model of a camera used to capture the input image.

6. A method as defined in claim 1, wherein the contrast loss score is representative of the amount of contrast in the input image that is not mapped into the first tone-mapped image.

7. A method as defined in claim 6, wherein the contrast loss score is generated by comparing the loss of perceivable luminance differences with respect to a standard tone mapping procedure.

8. A method as defined in claim 1, wherein the contrast waste score and the contrast loss score are tuned by generating a confidence parameter from those two scores.

9. A method as defined in claim 8, wherein the confidence parameter can be automatically adjusted.

10. A method as defined in claim 8, wherein the confidence parameter can be manually adjusted by a human operator.

11. A computer-implemented method for generating an HDR image, comprising:
    receiving a plurality of input images;
    if one or more of the input images are not in a linear color space format, with a computer, converting those input images to linear color space format;
    with a computer, aligning the linear color space images to a reference; and
    with a computer, creating an HDR image by merging the aligned linear color space images.

12. A method as defined in claim 11, wherein the images are merged by fusing the images.

13. A method as defined in claim 11, wherein the images are merged by reconstructing the images.

14. A method as defined in claim 13, the images having been captured with a camera that has a camera response curve, wherein the reconstructing includes transforming the images to a common scale by applying an inverse of the camera response curve.

15. A method as defined in claim 14, wherein the images on the common scale can be averaged on a pixel-by-pixel basis, with the under-exposed and over-exposed pixel values excluded from the average.

16. A method as defined in claim 13, further including tone mapping the reconstructed image.

17. A method as defined in claim 16, further including, for the case where the input images included RAW images, performing a sharpening operation on the RAW images.

18. A method as defined in claim 16, further including preserving skin tone of human subjects in the images while tone mapping.

19. A method as defined in claim 11, further including de-ghosting the aligned images before the images are merged.

20. A method as defined in claim 11, further including, for the case of HDR images to be prepared of subjects that include objects that are moving faster than humans can move, capturing the input images at points in time separated sufficiently to include at least one input image with the fast-moving object in the scene and at least one input image with the fast-moving object not in the scene.

21. A computer-implemented method for generating an HDR image, comprising:
    receiving a plurality of input images, the images having been captured with a camera that has a camera response curve;
    if one or more of the input images are not in a linear color space format, converting those input images to linear color space format;
    for the case where the input images included linear color space images, performing a sharpening operation on the linear color space images;
    aligning the linear color space images to a reference; and
    merging the aligned images to create an HDR image, the merging including reconstructing the images by transforming the images to a common scale by applying an inverse of the camera response curve.

22. A method as defined in claim 21, wherein the images on the common scale can be averaged on a pixel-by-pixel basis, with the under-exposed and over-exposed pixel values excluded from the average.

* * * * *